United States Patent [19]
Yamaguchi et al.

[11] Patent Number: 5,541,669
[45] Date of Patent: Jul. 30, 1996

[54] MOTION ADAPTIVE LUMINANCE SIGNAL AND COLOR SIGNAL SEPARATION FILTER

[75] Inventors: Noriyuki Yamaguchi; Takuji Kurashita; Mitsuru Ishizuka; Junko Taniguchi; Masaharu Yao, all of Nagaokakyo, Japan

[73] Assignee: Mitsubishi Denki Kabushiki Denki, Tokyo, Japan

[21] Appl. No.: 387,632

[22] Filed: Feb. 13, 1995

Related U.S. Application Data

[63] Continuation of Ser. No. 15,677, Feb. 9, 1993, abandoned, which is a continuation of Ser. No. 717,889, Jun. 19, 1991, abandoned, which is a continuation-in-part of Ser. No. 676,320, Mar. 28, 1991, abandoned.

[30] Foreign Application Priority Data

Mar. 29, 1990 [JP] Japan .................................. 2-86126

[51] Int. Cl.⁶ .................................................. H04N 9/78
[52] U.S. Cl. ............................ 348/669; 348/668; 348/665
[58] Field of Search ............................ 348/670, 669, 348/668, 667, 666, 665

[56] References Cited

U.S. PATENT DOCUMENTS

| | | | |
|---|---|---|---|
| 4,307,413 | 12/1981 | Takeuchi et al. | 358/31 |
| 4,597,001 | 6/1986 | Reitmeier et al. | 358/31 |
| 4,868,650 | 9/1989 | Weckenbrock | 358/105 |
| 4,930,012 | 5/1990 | Fujita | 358/105 |
| 4,954,885 | 9/1991 | Ito et al. | 358/31 |
| 4,994,900 | 2/1991 | Ebara | 358/31 |
| 5,015,818 | 9/1991 | Mishima | 358/31 |
| 5,023,713 | 6/1991 | Nishigori | 358/31 |
| 5,023,715 | 6/1991 | Owada | 358/105 |
| 5,051,818 | 9/1991 | Mishima | 358/31 |
| 5,051,826 | 9/1991 | Ishii | 358/105 |
| 5,097,321 | 3/1992 | Stern et al. | 358/21 R |
| 5,146,318 | 9/1992 | Ishizuka et al. | 358/31 |
| 5,150,202 | 9/1992 | Ledihn et al. | 358/31 |

OTHER PUBLICATIONS

ITEJ Technical Report, vol. 12, No. 41, pp. 13–17, Oct. 1988.
SMPTE Journal, "Cooperative Processing for Improved NTSC Chrominance/Luminance Separation," Aug. 1986, Strolle.

*Primary Examiner*—Victor R. Kostak
*Assistant Examiner*—Nathan J. Flynn

[57] ABSTRACT

A filter is used for separating luminance and color signals from a composite color television signal in which the frequency of the color signal is multiplexed over the high-frequency region of the luminance signal. When a picture is detected with respect to its motion under frame correlation and if that motion is relatively small, the separation of luminance and color signals is performed based on the interframe correlation. If the motion is relatively large, the separation of luminance and color signals is made based on the interfield correlation. The luminance and color signal separation based on the interfield correlation is attained from a correlation with signals in a field spaced forwardly away from the subject field by one field. This is accomplished by selecting a calculation having the highest correlation in calculations for an objective sample point and a plurality of sample points located about the objective sample point. Such a correlation is determined by checking the correlation of image signals in the set of sample points which are spaced apart from one another by one frame and located around the objective sample point.

97 Claims, 13 Drawing Sheets

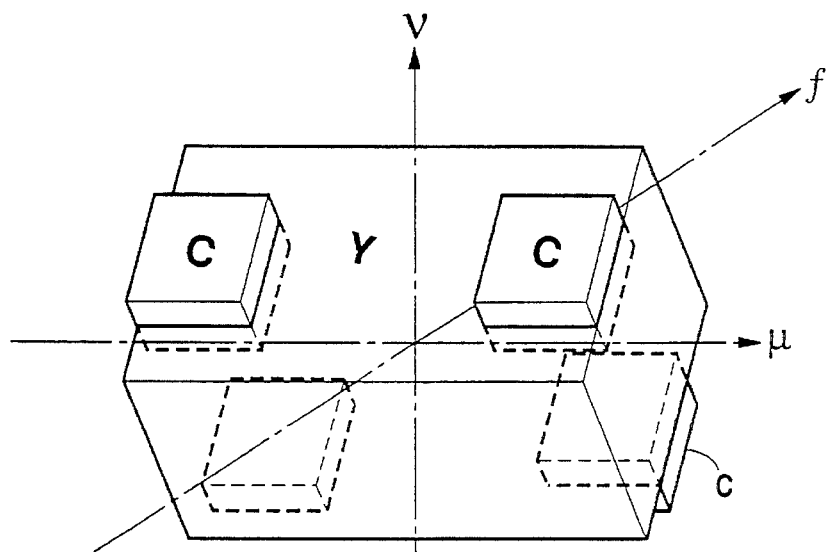
FIG. 6A
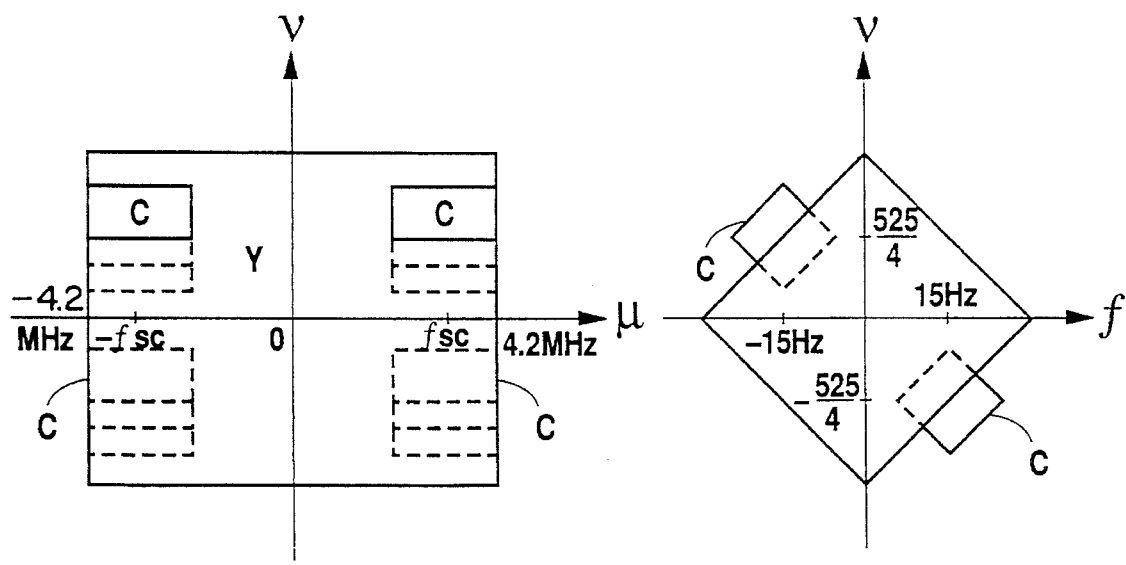
FIG. 6B  FIG. 6C

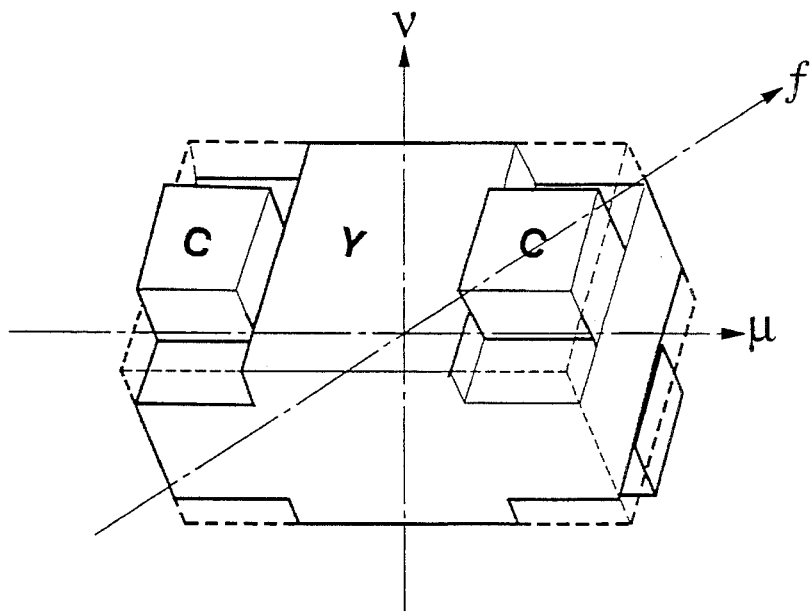
FIG. 7A
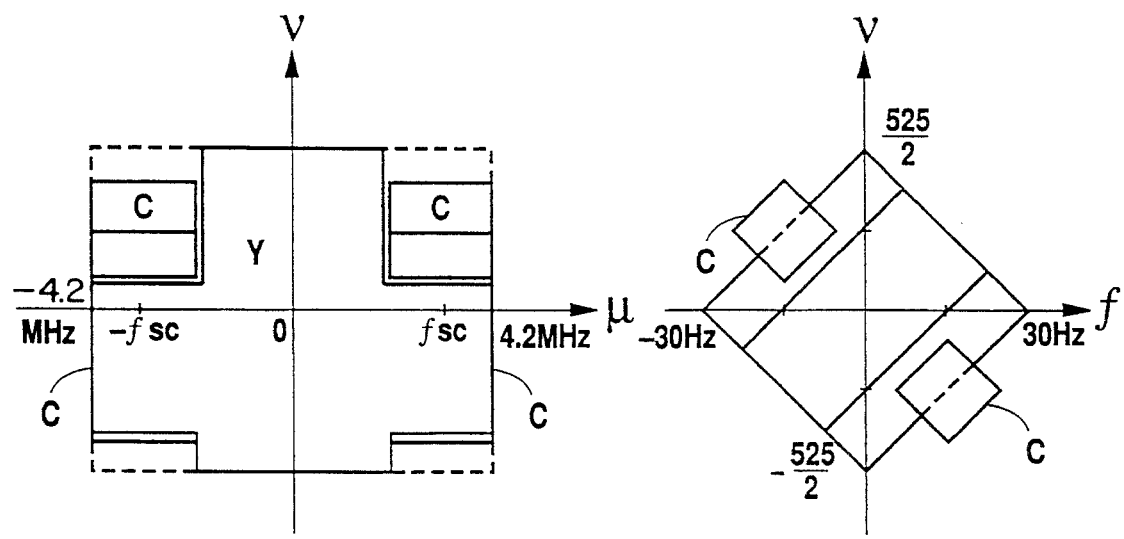
FIG. 7B     FIG. 7C

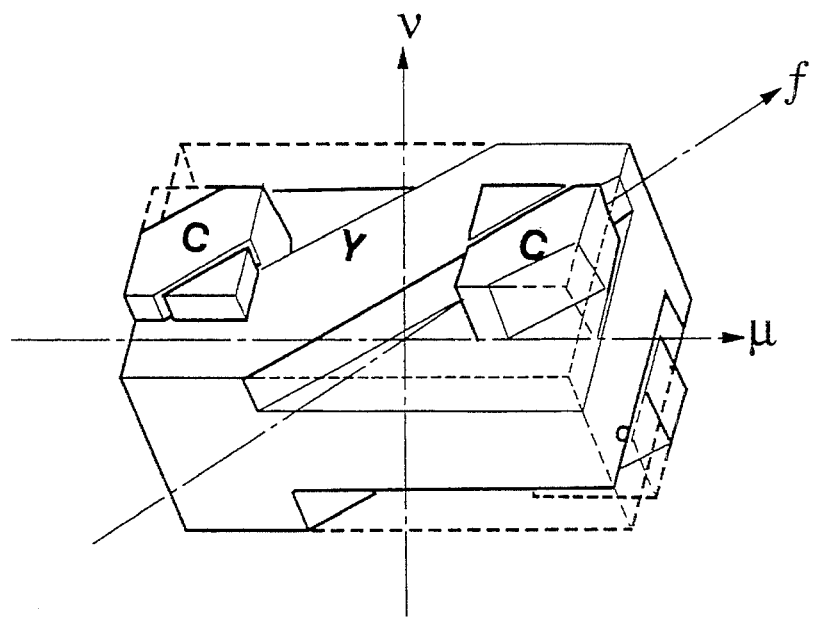
FIG. 9A
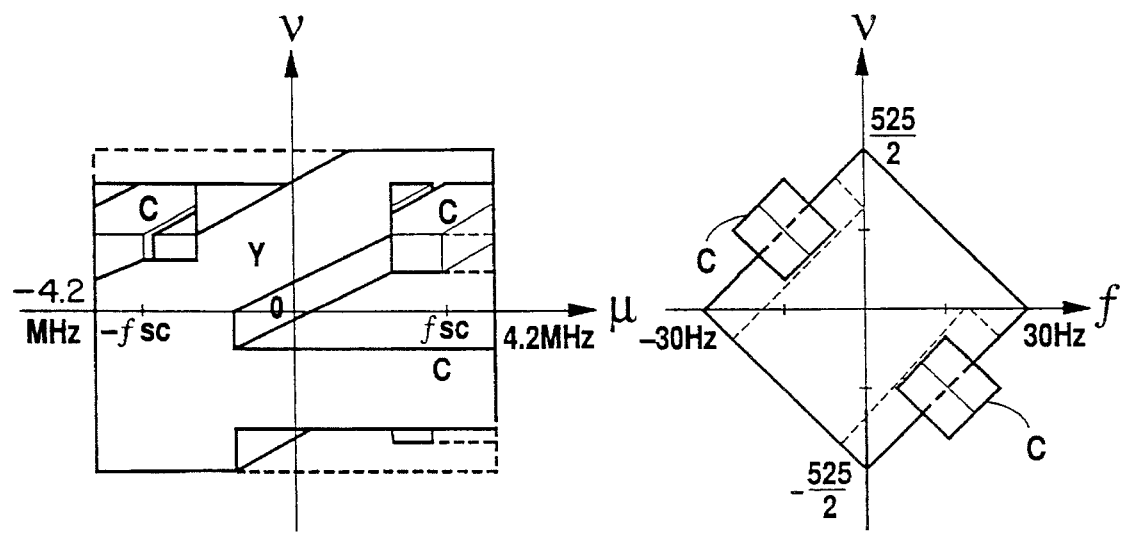
FIG. 9B  FIG. 9C

MOTION ADAPTIVE LUMINANCE SIGNAL AND COLOR SIGNAL SEPARATION FILTER

This application is a continuation of application Ser. No. 08/015,677 filed on Feb. 9, 1993, now abandoned; which is a continuation of application Ser. No. 07/717,889 filed on Jun. 19, 1991, now abandoned; which is a continuation-in-part of application Ser. No. 07/676,320 filed on Mar. 28, 1991, now abandoned.

BACKGROUND OF THE INVENTION

1. Field of the Invention

The present invention relates to a motion adaptive luminance signal and color signal separating filter for separating a luminance signal (hereinafter referred to as "Y signal" or simply "Y") and a color signal (hereinafter referred to as "C signal" or simply "C") from a composite color television signal (hereinafter referred to as "V signal") in which the frequency of the C signal is multiplexed on the high frequency region of the Y signal.

The motion adaptive YC separating filter is a filter which locally judges whether a picture is a still or motion picture and executes YC separation suitable to the pixel signal in that picture at each of the locations thereof.

2. Description of the Related Art

The current NTSC signal system provides a composite signal comprising a C signal and a Y signal having its high-frequency region on which the frequency of the C signal is multiplexed. Therefore, television sets require YC separation. Imperfect YC separation causes the picture quality to deteriorate in cross color, dot crawl and so on.

With development of large-capacity digital memories, there have been proposed various types of signal processing circuits for improving the quality of picture, for example, by using a motion adaptive YC separation which utilizes a delay circuit having a delay time equal to or greater than the vertical scanning frequency of a television signal.

FIG. 10 is a block diagram showing one example of the conventional motion adaptive YC separating filters. In FIG. 10, the filter receives, at its input terminal 1, a V signal 101 according to the NTSC system. This signal is shared and input to the respective input terminals of infield YC separation circuit 4, interframe YC separating circuit 5, Y-signal motion detecting circuit 6 and C-signal motion detecting circuit 7.

In the infield YC separating circuit 4, the input signal is infield separated into a Y signal 102 and a C signal 103 through an infield filter (not shown). The Y and C signals are then applied respectively to the first inputs of Y-signal mixing circuit 9 and C-signal mixing circuit 10.

In the interframe YC separating circuit 5, the input signal is interframe separated into a Y signal 104 and a C signal 105. These Y and C signals are then supplied respectively to the second inputs of the Y-signal and C-signal mixing circuits 9 and 10.

On the other hand, a signal 106 indicative of the amount of movement of Y signal detected by the Y-signal motion detecting circuit 6 is applied to one of the inputs of a synthesizer 8 while a signal 107 representative of the amount of movement of C signal detected by the C-signal motion detecting circuit 7 is supplied to the other input of the synthesizer 8.

The synthesizer 8 forms a motion detection signal 108 which is shared and input to the respective third inputs of the Y-signal and C-signal mixing circuits 9 and 10. Thus, the Y-signal motion detecting circuit 6, C-signal motion detecting circuit 7 and synthesizer 8 define a motion detecting circuit 80.

The output 2 of the Y-signal mixing circuit 9 provides a motion adaptive separated Y signal 109 while the output 3 of the C-signal mixing circuit 10 provides a motion adaptive separated C signal 110.

This conventional YC separating circuit will now be described in operation.

On YC separation of V signal 101, the motion detecting circuit 80 judges whether the V signal 101 is one indicative of a still or motion picture, based on the output signal from the synthesizer 8 in which the outputs of the Y-signal and C-signal motion detecting circuits 6 and 7 are synthesized.

As shown in FIG. 11, the Y-signal motion detecting circuit 6 may comprise a one-frame delay circuit 53, a subtracter 54, a low pass filter 55 (hereinafter referred to as "LPF"), an absolute value circuit 56 and a nonlinear converting circuit 57. V signal 101 inputted to the Y-signal motion detecting circuit 6 at its input 51 is delayed by one frame at the one-frame delay circuit 53. The V signal 101 is also applied directly to the subtracter 54 and then subtracted from the one-frame delayed signal to determine one-frame difference therebetween. The one-frame difference signal is passed through the low pass filter 55 (hereinafter referred to as "LPF") and is then is applied to the absolute value circuit 56 whereat the absolute value thereof is determined. The determined absolute value is then converted by the nonlinear converting circuit 57 into a signal 106 indicative of the movement of the low frequency component in the Y signal. This signal 106 is outputted from the output 52 of the Y-signal detecting circuit 6. The nonlinear converting circuit 57 serves to convert an absolute value into a data having a magnitude which can be more easily handled by the system.

As shown in FIG. 12, the C-signal motion detecting circuit 7 may comprise a two-frame delay circuit 81, a subtracter 82, a band pass filter 83 (hereinafter referred to as "BPF"), an absolute value circuit 84 and a nonlinear converting circuit 85. V signal 101 inputted to the C-signal motion detecting circuit 7 at its input 11 is delayed by one frame at the two-frame delay circuit 81. The V signal 101 is also applied directly to the subtracter 82 and then subtracted from the two-frame delayed signal to determine two-frame difference therebetween. The two-frame difference signal is passed through the band pass filter 83 and then applied to the absolute value circuit 84 whereat the absolute value thereof is determined. The determined absolute value is then converted by the nonlinear converting circuit 85 into a signal 107 indicative of the amount of movement of the C signal. This signal 106 is outputted from the output 89 of the C-signal detecting circuit 6.

The synthesizing circuit 8 is adapted to select and output the one of the Y-signal and C-signal movement signals 106 and 107 which is larger than the other movement signal.

Such a judgement is represented by a control signal 108 in the form of motion coefficient (0≦k≦1). If a picture is judged to be a complete still picture, the motion coefficient k is equal to zero. If the picture is judged to be a complete motion picture, the motion coefficient k is equal to one.

Generally, if a picture is a still picture, the interframe correlation is utilized to perform the interframe YC separation such that Y and C signals are separated from each other.

As shown in FIG. 13, the interframe YC separating circuit 5 may comprise a one-frame delay circuit 64, an adder 65 and a subtracter 66. V signal 101 inputted to the interframe YC separating circuit 5 at its input 61 is delayed by one frame at the one-frame delay circuit 64 to form a one-frame delay signal which in turn is added to the V signal directly inputted to the adder 65. The resultant one-frame sum provides a YF signal 104 which is outputted from one output 62 in the interframe YC separating circuit 5. At the same time, the subtracter 66 subtracts the YF signal 104 from the V signal 101 directly applied from the input 61 to the subtracter 66 to extract a CF signal 105. This, in turn is outputted from the output 63 of the interframe YC separating circuit 5.

In general, if a picture is a motion picture, the infield correlation is utilized to perform the infield YC separation such that the Y and C signals are separated from each other.

As shown in FIG. 14, the infield YC separating circuit 4 may comprise a one-line delay (one horizontal line . . . 1H delay) circuit 74, an adder 75 and a subtracter 76. V signal 101 inputted to the infield YC separating circuit 4 at its input 71 is delayed by one line at the one-line delay circuit 74 to form a one-line delay signal which in turn is added to the V signal directly inputted to the adder 75. The resultant one-line sum provides a Yf signal 102 which is outputted from one output 72 in the infield YC separating circuit 5. At the same time, the subtracter 76 subtracts the Yf signal 102 from the V signal 101 directly applied from the input 71 to the subtracter 76 to extract a Cf signal 103. This, in turn is outputted from the output 73 of the infield YC separating circuit 4.

Since the infield and interframe YC separating circuits 4 and 5 are arranged parallel to each other, the motion adaptive YC separation filter can causes the Y-signal mixing circuit 9 to calculate the following equation using the motion coefficient k synthesized by the synthesizer 8:

$$Y=kYf+(1-k)YF$$

where Yf is an output Y signal 102 from the infield YC separation and YF is an output Y signal 104 from the interframe YC separation. There is thus obtained a motion adaptive YC separation Y signal 109 which in turn is outputted from the motion adaptive YC separation filter at the output 2.

Similarly, the control signal 108 is utilized to cause the C-signal mixing circuit 10 to calculate the following equation:

$$C=kCF+(1-k)CF$$

where Cf is an output signal 103 from the infield YC separation and CF is an output signal 105 from the interframe YC separation. There is thus obtained a motion adaptive YC separation C signal 110 which in turn is outputted from the output 3.

The C-signal motion detecting circuit 7 may be arranged as shown in FIG. 15. In this figure, V signal 101 inputted to the circuit 7 at the input 11 is demodulated by a color demodulating circuit 86 into two color difference signals R-Y and B-Y. These color difference signals R-Y and B-Y are then applied to a time division multiplexer 87 in which they are time-division multiplexed at a certain frequency. The output signal from the time division multiplexer 87 is then subjected to subtraction from an output signal from a two-frame delay circuit 81. There is thus obtained a two-frame difference signal.

The two-frame difference signal is passed through BPF 83 wherein a Y-signal component is removed therefrom. The output signal of the BPF 83 is then applied to an absolute value circuit 84 to extract an absolute value therefrom. The absolute value is then applied to a nonlinear converter 85 wherein it is nonlinearly converted into a C-signal motion detection signal 107 which in turn is outputted from the output 89 of the C-signal motion detecting circuit 7.

It will be apparent from the foregoing that Yf and Cf signals from the infield YC separating circuit 4 and YF and CF signals from the interframe YC separating circuit 5 are respectively mixed with each other. They are mixed based on the amount of movement which is obtained by synthesizing the motion signals from the respective Y-signal and C-signal motion detecting circuits 6 and 7.

Therefore, the filter characteristics for the still picture will be completely different from that for the motion picture. If a picture is switched from a still to a motion picture or vice versa, the resolution is subjected to severe change such that the quality of picture will be remarkably degraded on processing the motion picture.

SUMMARY OF THE INVENTION

In order to overcome the above problem in the prior art, it is therefore an object of the present invention to provide a motion adaptive YC separation filter which can reproduce even such a multi-switched picture as described above with an increased resolution and with a reduced degradation of image quality.

To this end, the present invention provides a motion adaptive YC separation filter comprising an inframe YC separation circuit in which, when a motion picture is detected by a motion detecting circuit, an interframe correlation is locally detected with the detected result being utilized to adaptively select one inframe processing from a plurality of inframe processings including interfield operations and infield color signal band limitations, whereby output Y and C signals can be inframe separated from each other.

In another aspect of the present invention, the motion adaptive YC separation filter may comprise an inframe YC separation circuit in which when a motion picture is detected by a motion detecting circuit, an interframe correlation is locally detected with the detected result being utilized to adaptively select one inframe processing from a plurality of inframe processings, including interfield operations and infield luminance signal band limitations, whereby output Y and C signals can be inframe separated from each other.

When a motion picture is detected by a motion detecting circuit, the motion adaptive YC separation filter determines a correlation between frames. Depending on this correlation, one of three inframe YC separation circuits is selected to output Y and C signals from the inframe YC separation.

It will be apparent from the foregoing that when a motion picture is detected by the motion detecting circuit, the motion adaptive YC separation filter can cause the inframe YC separating circuits to detect a local correlation between frames to perform YC separation in three or four types of frames, including interfield operations and infield color signal band limitations. Upon processing any motion picture, therefore, the correlation in the picture can be utilized to perform an optimum YC separation with a reduced degradation of resolution.

Upon detection of a motion picture, furthermore, the motion adaptive YC separation filter of the present invention can cause the inframe YC separating circuits to detect a local correlation between frames to perform YC separation in three or four types of frames including interfield operations and infield luminance signal band limitations. Upon processing any motion picture, therefore, the correlation in the picture can be utilized to perform an optimum YC separation with a reduced degradation of resolution.

BRIEF DESCRIPTION OF THE DRAWINGS

FIG. 6A is an oblique view of the spectrum distribution of the V signal in a three-dimensional frequency space.

FIG. 6B is a view of the spectrum distribution of FIG. 6A as viewed along the f-axis from the negative side.

FIG. 6C is a view of the spectrum distribution of FIG. 6A as viewed along the μ-axis from the positive side.

FIG. 7A is an oblique view of the spectrum distribution of Y and C signals obtained from the first interfield YC separation according to the present invention in a three-dimensional frequency space.

FIG. 7B is a view of the spectrum distribution of FIG. 7A as viewed along the f-axis from the negative side.

FIG. 7C is a view of the spectrum distribution of FIG. 7A as viewed along the μ-axis from the positive side.

FIG. 9A is an oblique view of the spectrum distribution of Y and C signals obtained from the third interfield YC separation according to the present invention in a three-dimensional frequency space.

FIG. 9B is a view of the spectrum distribution of FIG. 9A as viewed along the f-axis from the negative side.

FIG. 9C is a view of the spectrum distribution of FIG. 9A as viewed along the μ-axis from the positive side.

DETAILED DESCRIPTION OF PREFERRED EMBODIMENTS

Figure 1:
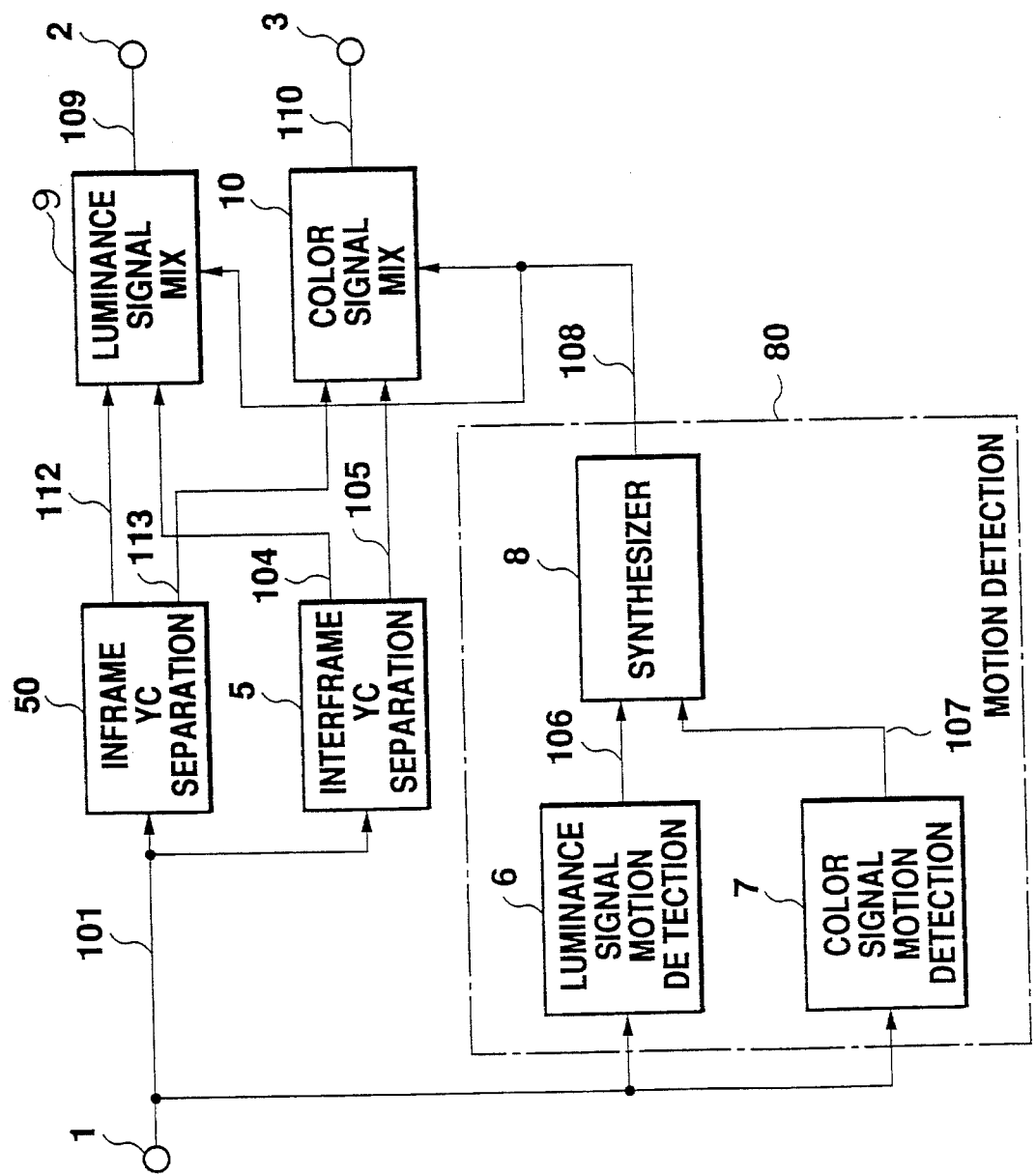
FIG. 1 is a block diagram of one embodiment of a motion adaptive YC separating filter constructed in accordance with the present invention.
Figure 10:
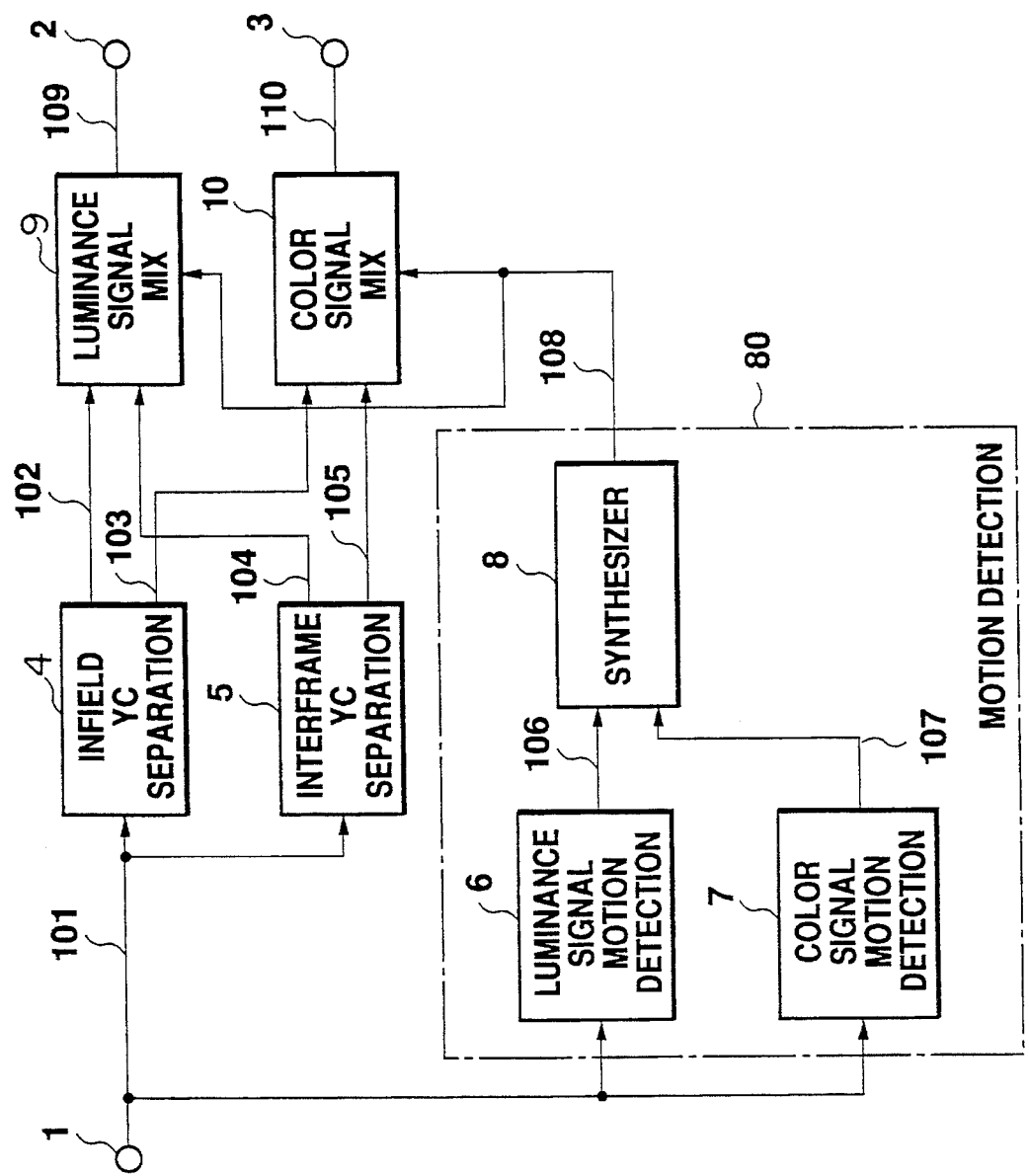
FIG. 10 is a block diagram of a conventional motion adaptive YC separation filter.
Figure 11:
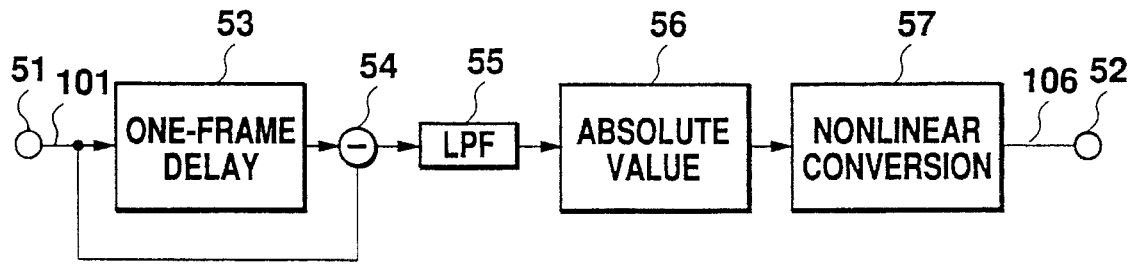
FIG. 11 is a block diagram of the details of a Y-signal motion detecting circuit in the conventional motion adaptive YC separation filter shown in FIG. 10.
Figure 12:
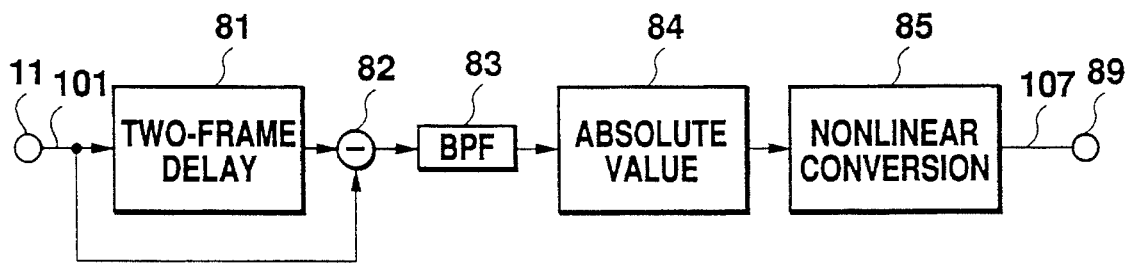
FIG. 12 is a block diagram of the details of a C-signal motion detecting circuit in the conventional motion adaptive YC separation filter shown in FIG. 10.
Figure 13:
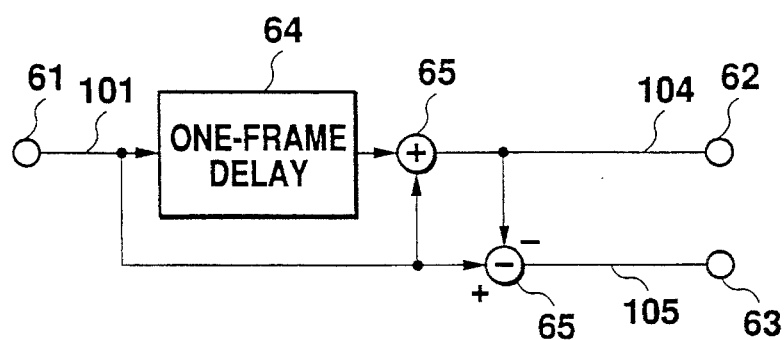
FIG. 13 is a block diagram of the details of an interframe YC separating circuit in the conventional motion adaptive YC separation filter shown in FIG. 10.
Figure 14:
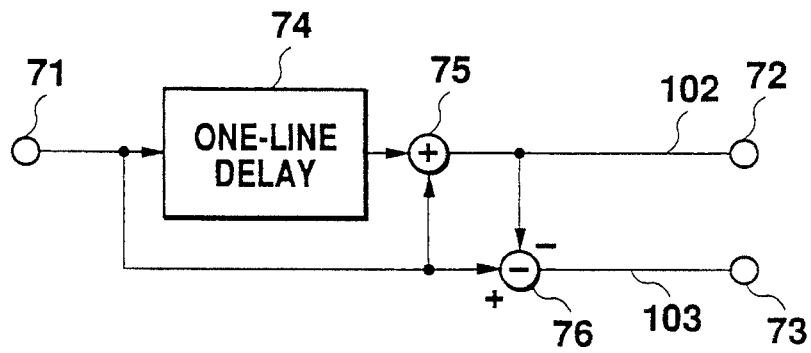
FIG. 14 is a block diagram of the details of an infield YC separating circuit in the conventional motion adaptive YC separation filter shown in FIG. 10.
Figure 15:
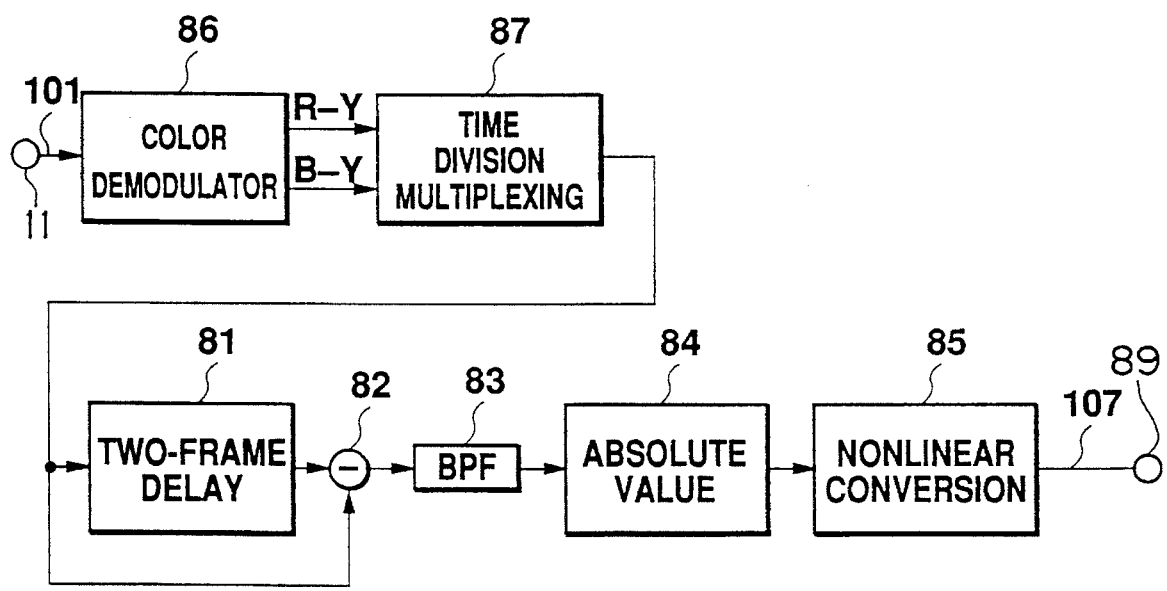
FIG. 15 is a block diagram illustrating another example of the conventional C-signal motion detecting circuits.

Several embodiments of a motion adaptive YC separation filter constructed in accordance with the present invention will now be described in connection with the drawings. FIG. 1 shows a block diagram of one embodiment of the present invention, wherein the infield YC separating circuit 4 shown in FIG. 10 is replaced by an inframe YC separating circuit 50. The remaining components are similar to those of FIG. 10 and will not be further described.

Figure 2:
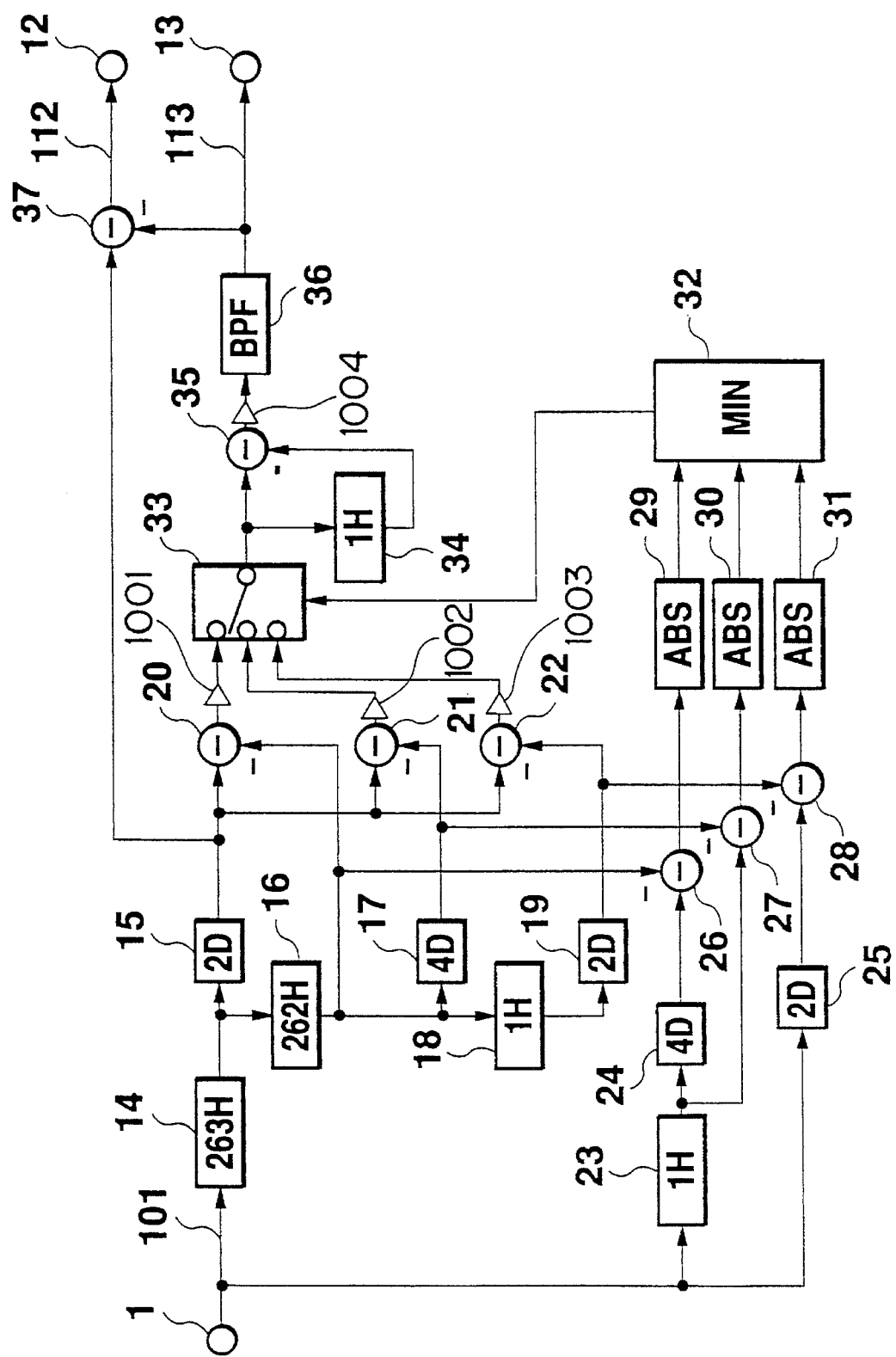
FIG. 2 is a block diagram of the details of an inframe YC separating circuit used in the embodiment of the present invention shown in FIG. 1.

The details of the inframe YC separating circuit 50 shown in FIG. 1 is illustrated in FIG. 2 by a block diagram.

Referring now to FIG. 2, the inframe YC separating circuit 50 receives a V signal 101 at its input terminal 11. This V signal 101 is applied to the respective inputs of a 263-line (263H) delay circuit 14, one-line (1H) delay circuit 23 and two-pixel (2D) delay circuit 25.

The V signal is delayed by 263 lines (one field) at the 263H delay circuit 14 and is then provided to a two-pixel (2D) delay circuit 15 and a 262-line (262H) delay circuit 16 at the respective inputs.

The V signal is delayed by two pixels at the 2D delay circuit 15 and then applied to the first inputs of subtracters 20, 21, 22 and 37, respectively. The V signal is delayed by 262 lines at the 262H delay circuit 16 and then supplied to the inputs of a four-pixel (4D) delay circuit 17 and one-line (1H) delay circuit 18, the first input of a subtracter 26 and the second input of the subtracter 20, respectively. The V signal delayed by four pixels at the 4D delay circuit 17 is inputted to the second input of the subtracter 21 and the first input of a subtracter 27. The V signal delayed by one line at the 1H delay circuit 18 is provided to the input of two-pixel (2D) delay circuit 19. The V signal is delayed by two pixels at the 2D delay circuit 19 and then applied to the second input of the subtracter 22 and the first input of a subtracter 28.

The output signal of the subtracter 20 is applied to a one-half multiplier 1001, and the output of one-half multiplier 1001 is applied to a signal selection circuit 33 at its first input. The output signal of the subtracter 21 is provided to a one-half multiplier 1002, and the output of one-half multiplier 1002 is applied to the second input of the signal selection circuit 33. The output signal of the subtracter 22 is supplied to a one-half multiplier 1003, and the output of one-half multiplier 1003 is applied to the third input of the signal selection circuit 33.

The V signal is delayed by one line at the 1H delay circuit 23 and is then applied to the input of a 4D delay circuit 24 and the second input of the subtracter 27. The V signal is further delayed by four pixels at the 4D delay circuit 24 and is then applied to the second input of the subtracter 26. The V signal delayed by two pixels at the 2D delay circuit 25 is provided to the second input of the subtracter 28.

The output of the subtracter 26 is provided to the input of an absolute value (ABS) circuit 29; the output of the subtracter 27 to the input of ABS circuit 30; and the output of the subtracter 28 to the input of ABS circuit 31.

The output of the ABS circuit 29 is applied to the first input of a minimum value selection circuit (MIN) 32; the output of the ABS circuit 30 to the second input of the MIN 32; and the output of the ABS circuit 31 to the third input of the MIN 32.

The output of the MIN 32 is supplied to the fourth input of the signal selection circuit 33, by which one of the first to third inputs will be selected in the circuit 33.

The output of the signal selection circuit 33 is applied to the input of a one-line (1H) delay circuit 34 and the first input of a subtracter 35, respectively. The output of the one-line (1H) delay circuit 34 is provided to the second input of the subtracter 35. The output of the subtracter 35 is applied to a one-half multiplier 1004, and the output of one-half multiplier 1004 is applied to the input of BPF 36.

The output of BPF 36 is provided to the second input of a subtracter 37 and also outputted through an output 13 as C signal 113 from the inframe YC separation. The output of the subtracter 37 is outputted through another output 12 as Y signal 112 from the inframe YC separation.

The operation will be described below:

Assuming that a scene includes a horizontal x-axis, a vertical y-axis, extending perpendicular to the x-axis in the same scene, and a time t-axis extending perpendicular to a plane defined by the x- and y-axes, it can be believed that a space defined by the three x-, y- and t-axes is a three-dimensional time space.

Figure 5B:
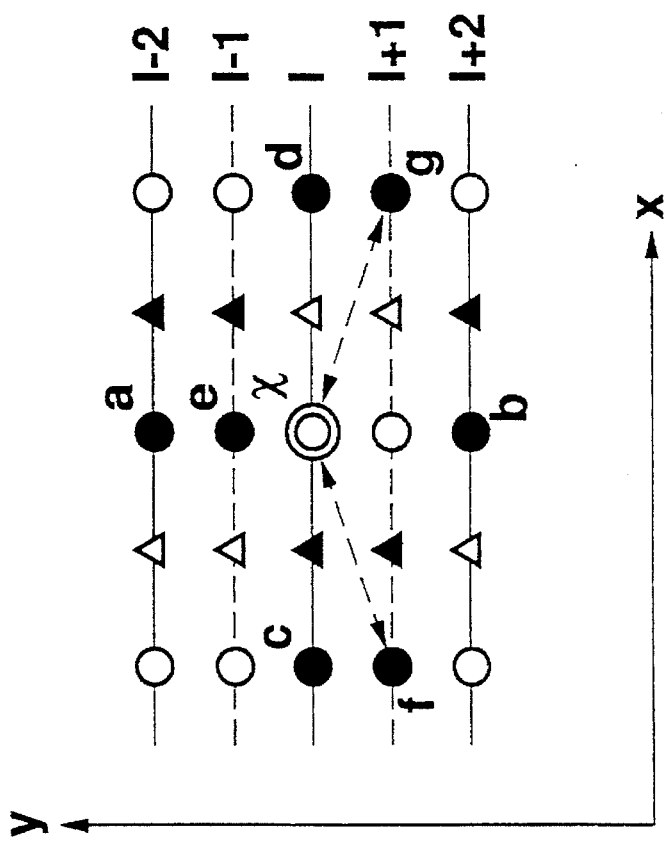
FIGS. 5B and 5C are plan views illustrating the arrangement of the same V signal represented by the use of x-axis and y-axis.
Figure 5A:
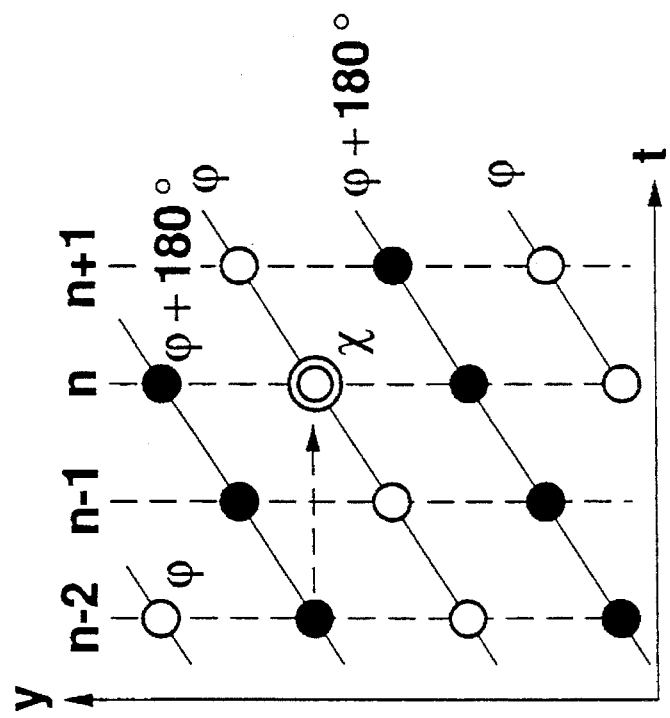
FIG. 5A is a plan view illustrating the arrangement of a V signal represented by the use of t-axis and y-axis, the V signal being digitized at a frequency four times as high as that of a chrominance subcarrier in a three-dimensional time space.
Figure 5C:
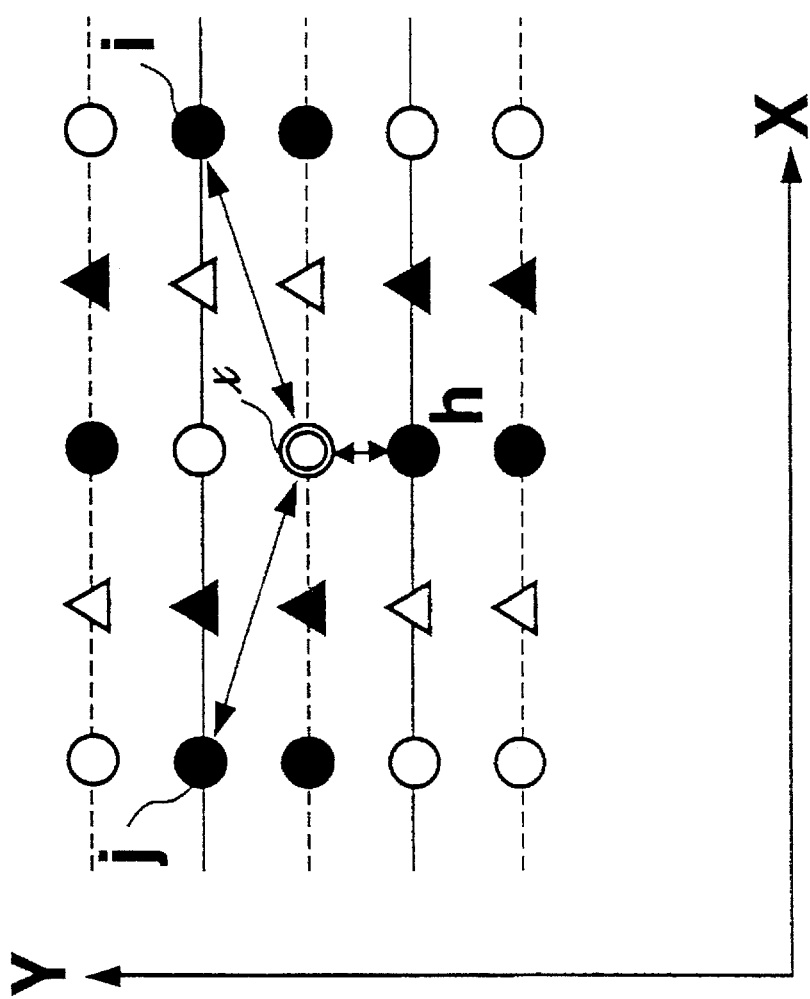

FIG. 5 shows such a three-dimensional time space. FIG. 5A shows a plane defined by the t- and y-axes while FIGS. 5B and 5C show a plane defined by the x- and y-axes. FIG. 5A also shows interlacing scan lines with a broken line illustrating one field. Solid lines depict that chrominance subcarriers are in phase.

In FIG. 5B, solid and broken lines represent scan lines in n and (n−1) fields, respectively. Four marks "○", "●", "△" and "▲" on each scan line represent sample points at which chrominance subcarriers are in phase when the V signal is digitized with a sampling frequency four times as high as the frequency fsc (=3.58 MHz) of the chrominance subcarrier.

In FIG. 5C, solid and broken lines represent scan lines in (n+1) and n fields, respectively. Four marks "○", "●", "△" and "▲" on each scan line are similar to those of FIG. B. The sample points "○", "△", "●", and "▲" have chrominance subcarriers which are out of phase by each 90° in such an order as described.

If it is assumed that an objective sample point is represented by a mark "⊙", the chrominance subcarriers are out of phase by 180° at four points a, b, c and d, which are at the respective second sample points measured forward and backward from the objective sample point "⊙" and on the respective first scan line spaced vertically away from the scan line of the objective sample point in the same field.

Therefore, by a digital circuit, there can be constructed a line comb filter or an adaptive YC separation filter, such as that disclosed in Japanese Patent Laid-Open No. 58-242367 and so on.

Since the chrominance subcarriers are out of phase by 180° at the identical sample points spaced away from each other by one frame as shown in FIG. 5A, the present invention can provide an inframe YC separating filter.

As can be seen from FIG. 5B, the phase of the chrominance subcarrier is reversed in (n−1) field spaced by one field apart from an objective sample point at a sample point on a line immediately above the scan line on which the objective sample point is located, or at two sample points on a line immediately below that scan line. Therefore, interfield YC separation can be achieved from an arithmetic operation between any one of these three points e, f and g and the objective point $\infty$.

If it is assumed that a horizontal frequency axis corresponding to the x-axis is μ-axis, a vertical frequency axis corresponding to the y-axis is ν-axis and a time frequency axis corresponding to the t-axis is f-axis, it can be believed that there is a three-dimensional frequency space defined by these μ-, ν- and f-axes perpendicular to each other.

FIG. 6 depicts such a three-dimensional frequency space in projection. FIG. 6A is an oblique view of the three-dimensional frequency space; FIG. 6B is a view of the three-dimensional frequency space as viewed along the f-axis from the negative side; and FIG. 6C is a view of the three-dimensional frequency space as viewed along the μ-axis from the positive side.

FIGS. 6A, 6B and 6C represent the spectrum distribution of a V signal in the three-dimensional frequency space. As seen from these figures, the spectrum of Y signal extends around the origin of the three-dimensional frequency space. C signal has four spectrums located in the three-dimensional frequency space at four points as shown in FIGS. 6A to 6C since I and Q signals are modulated into two quadrature phases at the frequency fsc of the chrominance subcarrier.

If the V signal is observed on the μ-axis as shown in FIG. 6C, however, the spectrums of the C signal will be only on the second and fourth quadrants.

This corresponds to the fact that solid lines representing the in-phase state of the chrominance subcarrier extend upwardly with the passage of time as shown in FIG. 5A.

The conventional motion adaptive YC separating filters performed YC separation by the use of infield correlation when a motion picture was detected. Therefore, although the conventional filters could carry out the band limitations in the directions of μ-axis and ν-axis, they could not take the band limitation in the direction of f-axis. This will cause a frequency space originally including Y signal to be separated as C signal, so that the band of Y signal in the motion picture will be decreased.

If the YC separation is made according to the aforementioned interfield processing operation, the band of Y signal in the motion picture can be increased.

Referring again to FIG. 5B, the (n−1) field includes three sample points "●" e, f and g which are near the objective sample point "⊙" $\infty$ and have chrominance subcarriers angularly spaced away from one another by 180°. Calculation for any one of the three sample points and the objective sample point permits the interfield YC separation.

First of all, high-frequency components including C signals in the three-dimensional frequency space can be taken out from a difference between the objective sample point "⊙" and the sample point "●" e in FIG. 5B. When the resulting difference signal is passed through the two-dimensional BPF defined by the 1H delay circuit 34, subtracter 35, one-half multiplier 1004 and BPF 36 as shown in FIG. 2, C signal 113 is obtained. When the C signal is subtracted from the V signal at the subtracter 37, Y signal 112 is obtained. This is referred to as "the first interfield YC separation".

FIGS. 7A, 7B and 7C are respectively similar to FIGS. 6A, 6B and 6C and illustrate a three-dimensional frequency space including the Y and C signals which have been obtained from the first interfield YC separation.

Secondly, high-frequency components including C signals in the three-dimensional frequency space can be taken out from a difference between the objective sample point "⊙" ⓧ and the sample point "●" f in FIG. 5B. When the resulting difference signal is passed through the aforementioned two-dimensional BPF, C signal 113 is obtained. When the C signal 113 is subtracted from the V signal at the subtracter 37, Y signal 112 is obtained. This is referred to as "the second interfield YC separation".

Figure 8A:
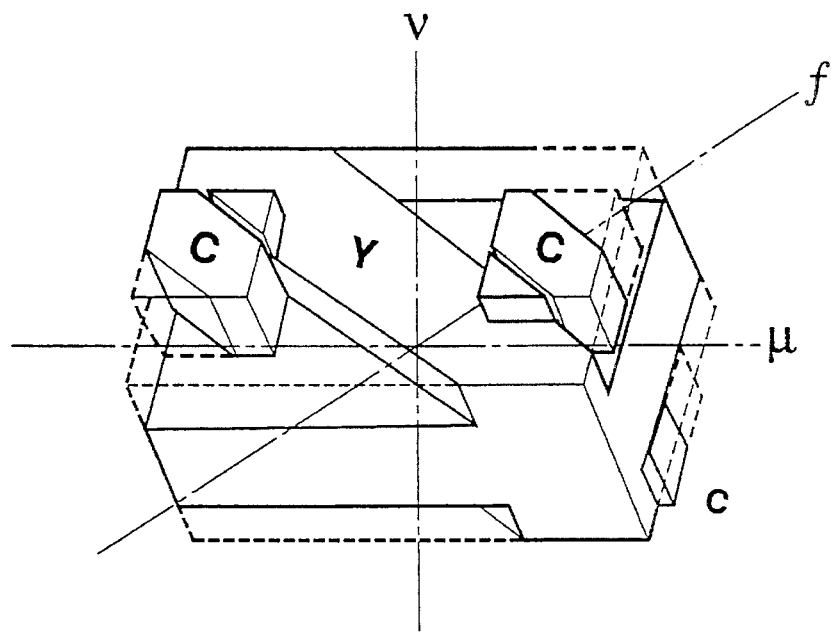
FIG. 8A is an oblique view of the spectrum distribution of Y and C signals obtained from the second interfield YC separation according to the present invention in a three-dimensional frequency space.
Figure 8B:
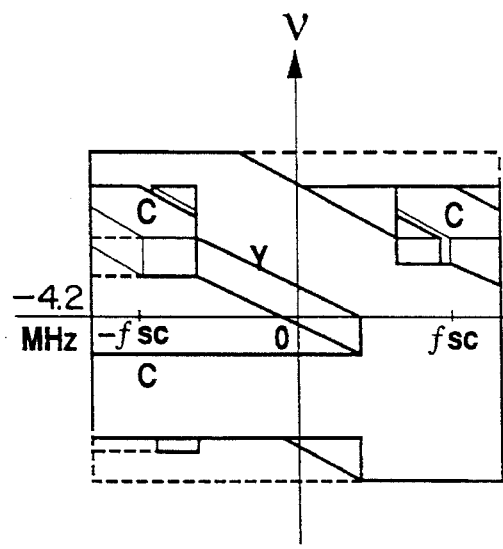
FIG. 8B is a view of the spectrum distribution of FIG. 8A as viewed along the f-axis from the negative side.
Figure 8C:
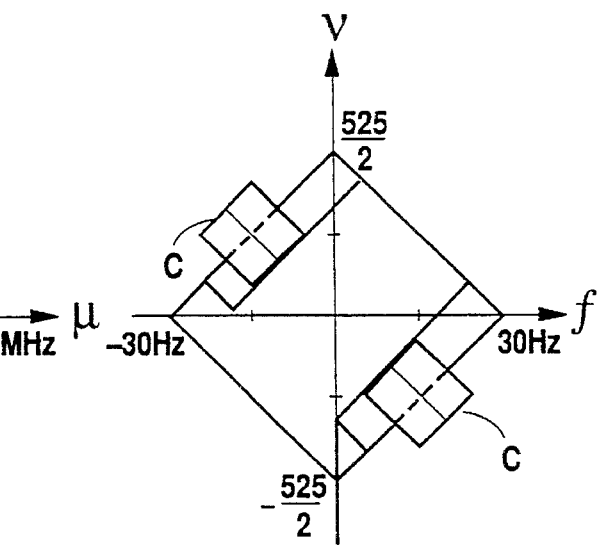
FIG. 8C is a view of the spectrum distribution of FIG. 8A as viewed along the μ-axis from the positive side.

FIGS. 8A, 8B and 8C similarly illustrate a three-dimensional frequency space including Y and C signals which have been obtained from the second interfield YC separation. From these figures, it appears that the C signals are partially included within the separated Y signal. However, there is an extremely small possibility that the C signals are contained in the Y signal, since great correlation exists between the Y and C signals.

Thirdly, high-frequency components including C signals in the three-dimensional frequency space can be taken out from a difference between the objective sample point "⊙" ⓧ and the sample point "●" g in FIG. 5B. When the resulting difference signal is passed through the aforementioned two-dimensional BPF, C signal is obtained. When the C signal is subtracted from the V signal, Y signal is obtained. This is referred to as "the third interfield YC separation".

FIGS. 9A, 9B and 9C similarly illustrate a three-dimensional frequency space including Y and C signals which have been obtained from the third interfield YC separation. From these figures, it appears that the C signals are partially included within the separated Y signal. However, there is an extremely little possibility that the C signals are contained in the Y signal, for the same reason as in FIG. 8.

In order to adaptively select one of the three, first, second and third interfield YC separations, it is required that correlations in the picture is detected in the directions of connection between the objective sample point "⊙" ⓧ and the respective one of the sample point e, f, and g. The correlations of the picture in the respective directions may be detected by calculating the sample points "●" e, f and g in the (n−1) field and the sample points "●" h, i and j in the (n+1) field, the objective sample point "⊙" ⓧ being located between the (n−1) and (n+1) fields. In such a manner, control signals can be obtained.

The inframe YC separation circuit shown in FIG. 2 will be described in operation below:

The present invention is characterized by, when a motion picture is detected by the motion detecting circuit 80, the motion picture is processed by the optimum selected one of the inframe YC separations including the aforementioned first, second and third interfield calculations, in place of the infield YC separation.

Referring again to FIG. 2, a V signal 101 inputted through the input 11 is delayed by 263 lines at the 263H delay circuit 14 and further delayed by two pixels at the 2D delay circuit 15. The V signal is further delayed by 262 lines at the 262H delay circuit 16.

The V signal delayed by two pixels at the 2D delay circuit 15 is subtracted from the output of the 262H delay circuit 16 at the subtracter 20 to provide an interfield difference for the third interfield YC separation which corresponds to the difference between the objective sample point ⓧ and the (n−1) field sample point g.

The V signal delayed by two pixels at the 2D delay circuit 15 is subtracted from the output of the 4D delay circuit 17 at the subtracter 21 to provide an interfield difference for the second interfield YC separation which corresponds to the difference between the objective sample point ⓧ and the (n−1) field sample point f.

The V signal delayed by two pixels at the 2D delay circuit 15 is subtracted from the output of the 2D delay circuit 19 at the subtracter 22 to provide an interfield difference for the first interfield YC separation which corresponds to the difference between the objective sample point ⓧ and the (n−1) field sample point e.

The three interfield differences thus obtained are then applied to the signal selection circuit 33 via one-half multipliers 1001–1003 and selected depending on the output of the minimum value selection circuit 32.

The outputs of the 262H and 4D delay circuits 16 and 24 are subjected to subtraction from each other at the subtracter 26, the resulting value being converted into an absolute value by the ABS circuit 29. Thus, the correlation between the sample points "●" g and j in FIGS. 5B and 5C can be detected. The outputs of the 4D and 1H delay circuits 17 and 23 are subjected to subtraction from each other at the subtracter 27, the resulting value being converted into an absolute value by the ABS circuit 30. Thus, the correlation between the sample points "●" f and i in FIGS. 5B and 5C can be detected. The outputs of the 2D delay circuits 19 and 25 are subjected to subtraction from each other at the subtracter 28, the resulting value being converted into an absolute value by the ABS circuit 31. Thus, the correlation between the sample points "●" e and h in FIGS. 5B and 5C can be detected.

The minimum value selection circuit 32 selects the minimum one of the three absolute values to control the signal selection circuit 33. The minimum absolute value is one which is minimum in differential absolute value but maximum in detection of correlation.

More particularly, the signal selection circuit 33 is adapted to select the output of the subtracter 20 via one-half multiplier 1001 if the output of the ABS circuit 29 is minimum; the output of the subtracter 21 via one-half multiplier 1002 if the output of the ABS 30 is minimum; and the output of the subtracter 22 via one-half multiplier 1003 if the output of the ABS circuit 31 is minimum.

The output of the signal selection circuit 33 is passed through the 1H delay circuit 34 and subtracter 35 to separate only the vertical high-frequency component therefrom. Further, the output of the subtracter 35 is passed via one-half multiplier 1004 through the BPF 36 to separate only the horizontal high-frequency component therefrom. Namely, the output of the signal selection circuit 33 is subjected to the two-dimensional band limitation by the two-dimensional BPF to provide C signals 113 from the inframe YC separation.

The subtracter 37 can subtract the C signals 113 of the inframe YC separation from the V signal which is the output of the 2D delay circuit 15 to provide a Y signal 112 of the inframe YC separation.

Although the arrangement of FIG. 2 has been described as to the use of the 1H delay circuit 34 and subtracter 35 for permitting only the vertical high-frequency component to pass therethrough, similar advantages may be attained by utilizing a plurality of 1H delay circuits in place of the 1H delay circuit 34 and subtracter 35.

Figure 3:
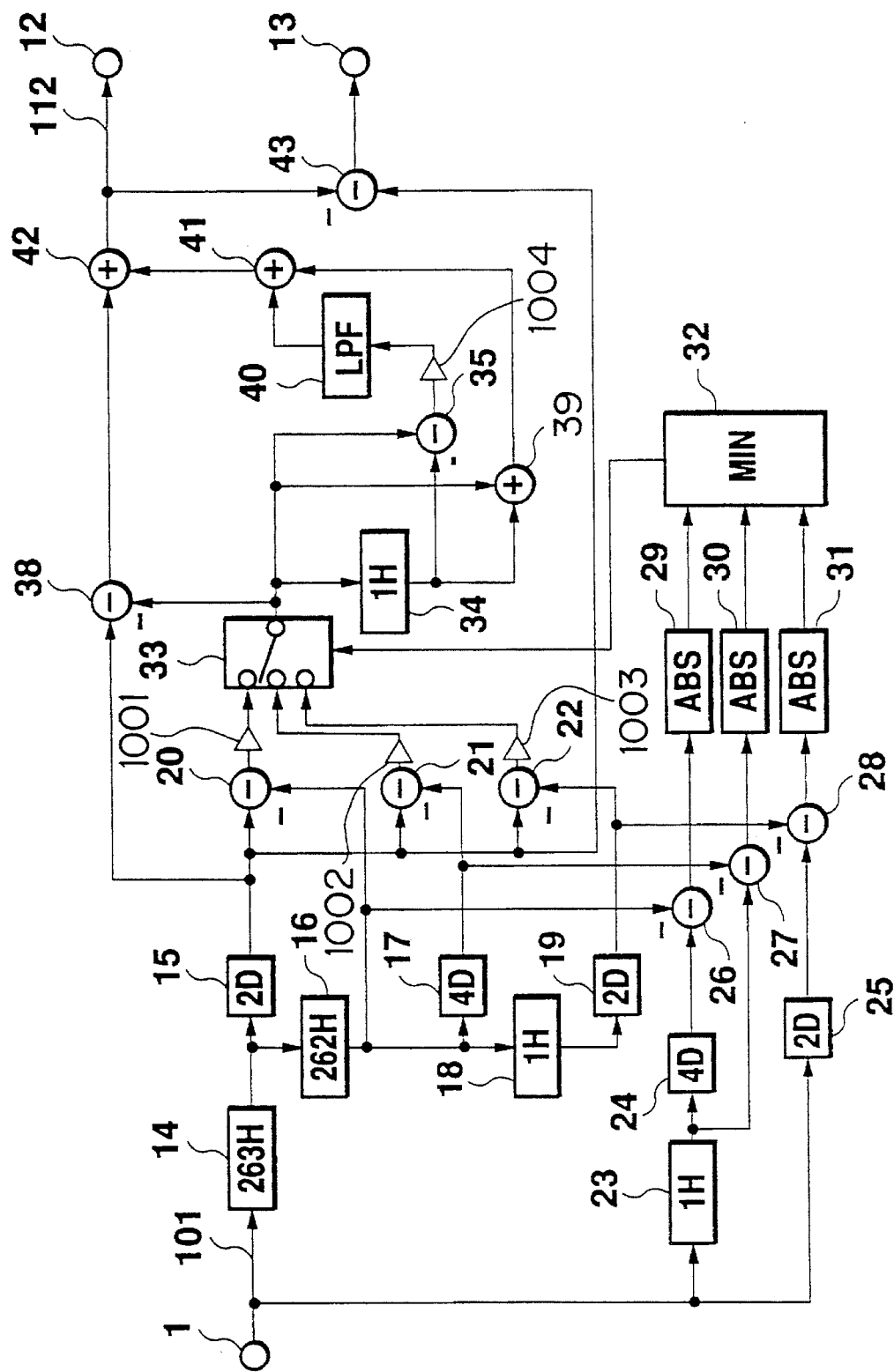
FIG. 3 is a block diagram of the detail of another inframe YC separating circuit usable in the embodiment of the present invention shown in FIG. 1.

FIG. 3 is a block diagram of the second embodiment of the inframe YC separation filter 50 constructed in accordance with the present invention and shown in FIG. 1.

The second embodiment of FIG. 3 is distinguished from the arrangement of FIG. 2 only in the manner of infield band limitation. Therefore, the following description will be made only in connection with an infield band limitation in the inframe YC separation circuits of FIG. 3, which is different from that of FIG. 2. It is to be noted that parts of FIG. 3 similar to those of FIG. 2 are designated by similar reference numerals.

The output of the signal selection circuit 33 is a high-frequency component in the three-dimensional frequency space which is obtained from any one of the three interfield calculations. Thus, the output of the signal selection circuit 33 is subtracted, at the subtracter 38, from the V signal which is the output of the 2D delay circuit 15, so as to provide a low-frequency component in the three-dimensional frequency space in the direction wherein the correlation is detected. The low-frequency component thus obtained is applied to the first input of the adder 42. The output of the signal selection circuit 33 is passed through the 1H delay circuit 34 and adder 39 to separate only its vertical low-frequency component and also passed through the 1H delay circuit 34 and subtracter 35 to separate only its vertical high-frequency component. The output of the subtracter 35 is applied to the LPF 40 via multiplier 1004 whereat only the horizontal low-frequency component thereof is separated, and then provided to the first input of the adder 41. On the other hand, the output of the adder 39 is applied to the second input of the adder 41, the output of the adder 41 providing a signal in which C signals are removed from the high-frequency component in the three-dimensional frequency space. At the adder 42, this signal is added to the low-frequency component in the three-dimensional frequency space to provide a Y signal 112 from the inframe YC separation.

The subtracter 43 subtracts the Y signal 112 from the output Y signal of the 2D delay circuit 15 to provide C signals 113 from the inframe YC separation.

Figure 4:
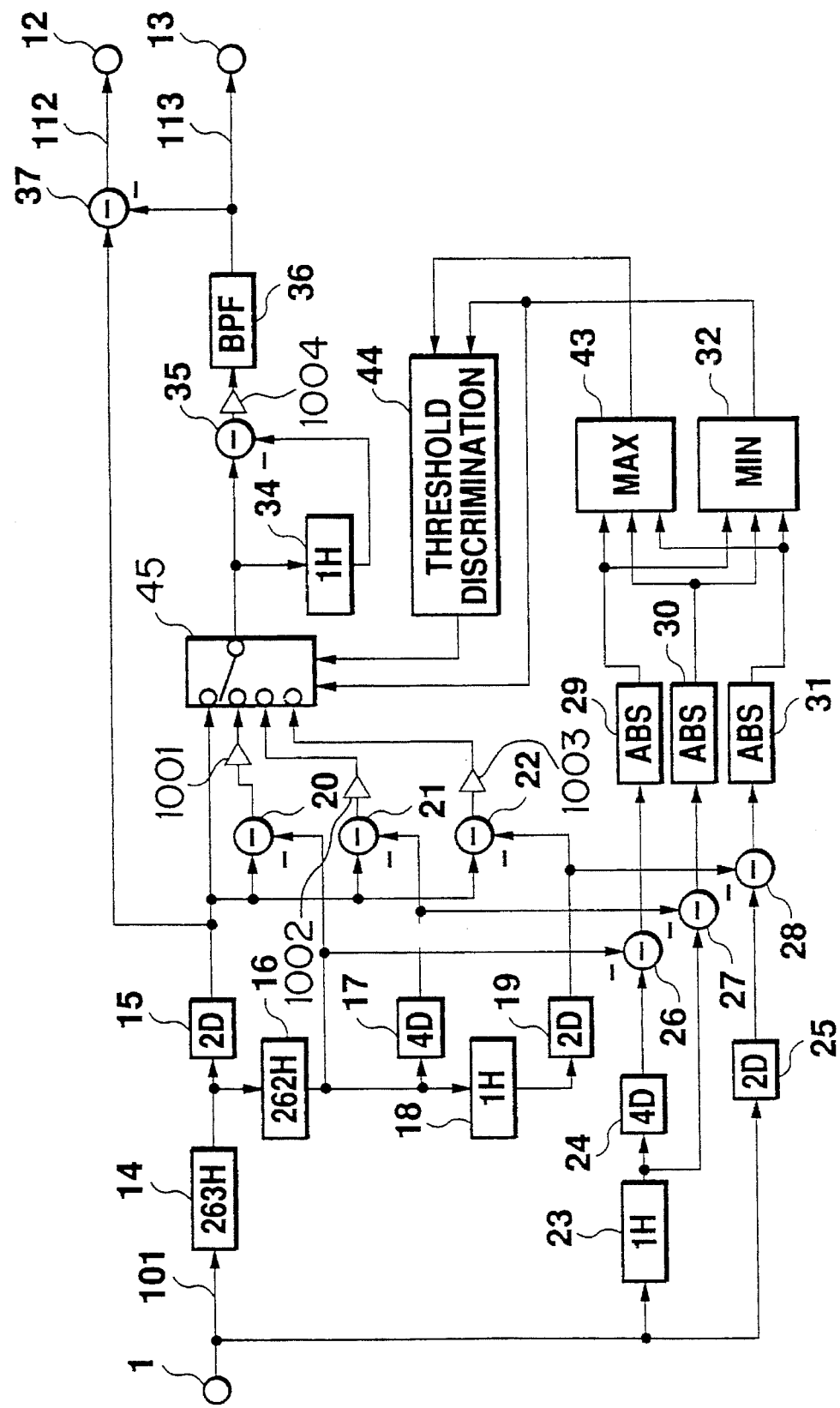
FIG. 4 is a block diagram of the detail of still another inframe YC separating circuit usable in the embodiment of the present invention shown in FIG. 1.

FIG. 4 is a block diagram of the third embodiment of the inframe YC separation circuit 50 shown in FIG. 1.

The arrangement of FIG. 4 is distinguished from that of FIG. 2 only in that in addition to the inframe YC separation circuits including three different interfield calculations and infield color signal band limitations there is a inframe YC separation circuit using only infield color signal band limitation. The optimum one of the four inframe YC separation circuits is selected and utilized. There will be described only an interframe correlation detecting circuit in the inframe YC separating circuits of FIG. 4, which is different from those of FIG. 2. Parts similar to those of FIG. 2 are designated by similar reference numerals.

The output of the 2D delay circuit 15 is applied to the first inputs of the subtracters 20, 21, 22, 37 and also to the first input of a signal selection circuit 45. The output of the subtracters 20, 21 and 22 are respectively provided to the second, third and fourth inputs of the signal selection circuit 45 via one-half multipliers 1001–1003, respectively. The output of the ABS circuit 29 is respectively applied to the first inputs of maximum and minimum value selection circuits 43 and 32. The output of the ABS circuit 30 is applied to the second inputs of the maximum and minimum value selection circuits 43 and 32, respectively. The output of the ABS circuit 31 is applied to the third inputs of the maximum and minimum value selection circuits 43 and 32, respectively. The output of the maximum value selection circuit 43 is applied to the first input of a threshold discriminating circuit 44. The output of the minimum value selection circuit 32 is provided to the second input of the threshold discriminating circuit 44 and also to the fifth input of the signal selection circuit 45. The output of the threshold discriminating circuit 44 is applied to the sixth input of the signal selection circuit 45. The threshold discriminating circuit 44 is adapted to control the signal selection circuit 45 such that it selects the output of the 2D delay circuit 15 if the maximum one of the three interframe correlations is smaller than a first threshold a or if the minimum interframe correlation is larger than a second threshold $\beta$. Components following the signal selection circuit 45 are the same as those of FIG. 2. In this case, the YC separation is made only from the infield band limitations. On the other hand, the threshold discriminating circuit 44 is adapted to control the signal selection circuit 45 such that if the maximum of the three interframe correlations is larger than the first threshold $\alpha$ or if the minimum is smaller than the second threshold $\beta$, the signal selection circuit 45 selects the output of the subtracter 20 when the output of the ABS circuit 29 is minimum; the output of the subtracter 21 when the output of the ABS circuit 30 is minimum; and the output of the subtracter 21 when the output of the ABS circuit 30 is minimum, in response to the output of the minimum value selecting circuit 32. As in the embodiment of FIG. 2, this arrangement also adaptively performs the inframe YC separations including the interfield calculations and infield color signal band limitations. It is however required to be a relationship, $\alpha<\beta$.

The embodiment of FIG. 3 can adaptively control the YC separation only due to the infield band limitations and the three inframe YC separations, by using the maximum value selection circuit 43, threshold discriminating circuit 44 and signal selection circuit 45 as shown in FIG. 4.

Although all the embodiments of FIGS. 2 to 4 have been described as to the YC separating filter utilizing the interfield calculations between the n field and the (n–1) field, this may be replaced by interfield calculations between the (n+1) and n fields. More particularly, the same inframe YC separating circuits may be provided by calculations between the objective sample point "⊙" and the respective sample points "●" h and i in the (n+1) field, depending on the results of three detections of interframe correlation.

From the above-described embodiments of the present invention, it is apparent that the present invention may be modified as would occur to one of ordinary skill in the art without departing from the spirit and scope of the present invention, which should be defined solely by the appended claims. Changes and modifications of the system, method, and apparatus contemplated by the present preferred embodiments will be apparent to those of ordinary skill in the art.

We claim:

1. A motion adaptive luminance and color signal separating filter for separating luminance and color signals from a composite color television signals in which the frequency of the color signal is multiplexed over a high-frequency region of the luminance signal, the filter comprising:

an interfield correlation device for separating the luminance and color signals in response to interfield correlation, the interfield correlation device for separating the luminance and color signals including, (A) a luminance and color signal separating circuit for mathematically summing a signal indicative of an objective sample point in one field and one of a plurality of signals indicative of sample points located proximate to the objective sample point in a picture, and within fields adjacent to the one field, to provide the interfield correlation which is utilized in performing the separation of the color and luminance signals;

(B) a correlation detecting circuit for calculating a difference signal among the sample points in which chrominance subcarriers are in phase between the frames and spaced apart from one another by one frame, the calculated difference signal being used to detect a direction in which sample points, located proximate to the objective sample point, have a highest correlation; and (C) a selection circuit for selecting a signal, to be summed with a signal indicative of an objective sample point, having a direction of highest correlation in said luminance and color signal separating circuit, based on the direction of correlation calculated by said correlation detecting circuit.

2. The motion adaptive luminance and color signal separating filter of claim 1, further comprising:

(A) motion detecting means for detecting motion in the composite color television signal, based on interframe correlation;

(B) interframe correlation luminance and color signal separation means for separating the luminance and color signals, based on the interframe correlation; and (C) mixing means for receiving more of an output of said interfield correlation device if the motion detected by said motion detecting means is relatively large and for receiving more of an output of said interframe correlation luminance and color signal separating means if the motion detected by said motion detecting means is relatively small, said relatively large motion being large relative to said relatively small motion, whereby luminance and color signals output from said interfield correlation device and interframe correlation luminance and color signal separating means can be mixed.

3. The motion adaptive luminance and color signal separating filter of claim 2, wherein said sample points used in calculating the difference signal in said correlation detecting circuit are present within fields forwardly and rearwardly adjacent to the one field including the objective sample point and located with objective sample point being in a picture therebetween.

4. The motion adaptive luminance and color signal separating filter of claim 3 wherein said luminance and color signal separating circuit of said interfield correlation device is adapted to extract a color signal by subtracting signal indicative of the objective sample point and signals indicative of three sample points located in a field spaced one field away from the objective sample point, and having chrominance subcarriers placed out of phase by 180°.

5. The motion adaptive luminance and color signal separating filter of claim 4, further comprising a two-dimensional band pass filter for extracting only a color signal having a predetermined frequency from the signal selected by said selecting circuit.

6. The motion adaptive luminance and color signal separating filter of claim 5, wherein said two-dimensional band pass filter comprises a one-line delay circuit for delaying the selected signal output by said selection circuit by one horizontal line; a subtracter for subtracting an output of said one-line delay circuit from the selected signal; and a band pass filter for extracting a signal having a predetermined range of frequency from an output of said subtracter.

7. The device as claimed in claim 5, further comprising a subtractor for subtracting said color signal from said composite color signal to generate a luminance signal.

8. The motion adaptive luminance and color signal separating filter of claim 2, wherein said correlating detecting circuit comprises a plurality of absolute value circuits each for determining respective absolute values of a plurality of difference signals; and a minimum value selection circuit for determining a minimum absolute value from output absolute value signals of said plurality of absolute value circuits.

9. The motion adaptive luminance and color signal separating filter of claim 2, further comprising infield luminance and color signal separating means for separating luminance and color signals using infield band limitations.

10. The motion adaptive luminance and color signal separating filter of claim 8, further comprising a plurality of subtracters for calculating differences; a plurality of absolute value circuits for determining respective absolute values from respective output signals of said subtracters; a minimum value selection circuit for determining a minimum value of signals output from said plurality of absolute value circuits; a maximum value selection circuit for determining a maximum value of signals output from said plurality of absolute value circuits; and a discriminating circuit for comparing outputs of said minimum and maximum value selection circuits with predetermined thresholds, whereby said selection circuit can be controlled to select an output from said infield luminance and color signal separating means if the output of said maximum value circuit is smaller than a predetermined threshold $\alpha$ and if the output of said minimum value circuit is larger than another predetermined threshold $\beta$, and whereby said selection circuit can be controlled to select an output from said interfield correlation device if the output of said maximum value circuit is larger than said predetermined threshold e and if the output of said minimum value circuit is smaller than said another predetermined threshold $\beta$.

11. The device as claimed in claim 1, wherein said luminance and color signal separating circuit comprises:

a first delay delaying said composite color signal by 262 lines;

a second delay delaying said composite color signal by two pixels;

a first subtractor subtracting output of said first delay from output of said second delay to generate a signal for selection by said selection circuit;

a third delay delaying output from said first delay by four pixels;

a second subtractor subtracting output of said third delay from output of said second delay to generate a signal for selection by said selection circuit;

a fourth delay delaying output from said first delay by one line;

a fifth delay delaying output from said fourth delay by two pixels; and a third subtractor subtracting output of said fifth delay from output of said second delay to generate a signal for selection by said selection circuit.

12. A device for producing a chrominance signal from a composite color signal comprising:

separating means for separating a chrominance signal from the composite color signal by using a composite color signal from a first field and a composite color signal from a second field;

filter means for filtering the separated chrominance signal, thereby producing the chrominance signal; and wherein said separating means outputs the separated chrominance signal and the composite color signal, the separated chrominance signal being a high-frequency component in three-dimensional frequency space;

said filter means including, delay means, operatively connected to said separating means for delaying the separated chrominance signal by one horizontal line, first means, operatively connected to said separating means, for subtracting the separated chrominance signal from the composite color signal to produce a low-frequency component in three-dimensional frequency space, second means, operatively connected to said separating means and said delay means, for subtracting the delayed chrominance signal from the separated chrominance signal to produce a difference signal, a low pass filter, operatively connected to said second means, to filter the difference signal to produce a filtered signal, third means, operatively connected to said separating means and said delay means, for adding the delayed chrominance signal to the separated chrominance signal to produce a first sum signal, fourth means, operatively connected to said low pass filter and said third means, for adding said filtered signal to said first sum signal to produce a second sum signal, fifth means, operatively connected to said first means and said fourth means, for adding said low-frequency component in three-dimensional frequency space to said second sum signal to produce a third sum signal, and sixth means, operatively connected to said separating means and said fifth means, for subtracting said third sum signal from the composite color signal, thereby producing the chrominance signal.

13. The device as claimed in claim 12 wherein said third sum signal is a luminance signal.

14. A device for producing a chrominance signal from a composite color signal comprising:

separating means for generating three distinct separated chrominance signals from the composite color signal, each separated chrominance signal being derived from a composite color signal of a first field and a composite color signal of a second field, and for outputting said three distinct separated chrominance signals;

selecting means, operatively connected to said separating means, for evaluating a correlation relationship between sample; points in different fields and for selecting one of said three distinct separated chrominance signals in accordance with the correlation evaluation; and filter means, operatively connected to said selecting means, for filtering the selected signal, thereby producing the chrominance signal.

15. The device as claimed in claim 14 wherein said separating means mathematically sums a composite color signal of an objective sample point in a first field and one of a plurality of composite color signals of sample points located proximate to the objective sample point in a second field to provide interfield processing of the composite color signal.

16. The device as claimed in claim 15 wherein said selecting means further comprises:

correlation means for calculating a difference signal among the sample points in which chrominance subcarriers are in phase between frames and spaced apart from one another by one frame and for determining a direction of the sample points, located proximate to the objective sample point, which has a highest correlation value and a direction which has a lowest correlation value.

17. The device as claimed in claim 14 wherein said filter means is a two dimensional band pass filter.

18. The device as claimed in claim 14 wherein said filter means comprises:

delay means, operatively connected to said selecting means, for delaying the selected signal by one horizontal line;

subtracting means, operatively connected to said selecting means and said delay means, for subtracting the delayed chrominance signal from the selected signal to produce a resultant signal; and a band pass filter, operatively connected to said subtracting means, to filter the resultant signal, thereby producing the chrominance signal.

19. The device as claimed in claim 14, wherein said separating means outputs the separated chrominance signal and the composite color signal;

said filter means including, first means, operatively connected to said separating means, for generating a high frequency component in three-dimensional frequency space; and second means, operatively connected to said separating means and said first means, for generating the chrominance signal form the composite color signal, the separated chrominance signal, and the high frequency component in three-dimensional frequency space.

20. The device as claimed in claim 14, wherein said separating means generates said three distinct separated chrominance signals using said composite color signal of said second field which is adjacent to said first field.

21. The device as claimed in claim 14, wherein said separating means comprises:

first delay means for delaying said composite color signal by 262 lines;

second delay means for delaying said composite color signal by two pixels;

first subtractor means for subtracting output of said first delay from output of said second delay to generate one of said distinct separated chrominance signals;

third delay means for delaying output from said first delay by four pixels;

second subtractor means for subtracting output of said third delay from output of said second delay to generate one of said distinct separated chrominance signals;

fourth delay means for delaying output from said first delay by one line;

fifth delay means for delaying output from said fourth delay by two pixels; and third subtractor means for subtracting output of said fifth delay from output of said second delay to generate one of said distinct separated chrominance signals.

22. The device as claimed in claim 14, wherein said separating means outputs said composite color signal; and said selecting means selects either one of said three distinct separated chrominance signals or said composite color signal in accordance with the correlation evaluation.

23. The device as claimed in claim 22 wherein said selecting means further comprises:

correlation means for calculating a difference signal among the sample points in which chrominance subcarriers are in phase between frames and spaced apart from one another by one frame and for determining a direction of the sample points, located proximate to the objective sample point, which has a highest correlation value and a direction which has a lowest correlation value;

threshold means for determining when the lowest correlation value is below a first threshold value and the highest correlation value is above a second threshold value;

said selecting means outputting said composite color signal when said threshold means determines that the lowest correlation value is below the first threshold value and the highest correlation value is above the second threshold value; and said selecting means outputting the separated chrominance signal corresponding to the highest correlation value when said threshold means determines that the lowest correlation value is not below the first threshold value and the highest correlation value is not above the second threshold value.

24. The device as claimed in claim 14, wherein said separating means outputs the separated chrominance signal and the composite color signal, the separated chrominance signal being a high-frequency component in three-dimensional frequency space; said filter means including, delay means, operatively connected to said separating means for delaying the separated chrominance signal by one horizontal line, first means, operatively connected to said separating means, for subtracting the separated chrominance signal from the composite color signal to produce a low-frequency component in three-dimensional frequency space, second means, operatively connected to said separating means and said delay means, for subtracting the delayed chrominance signal from the separated chrominance signal to produce a difference signal, a low pass filter, operatively connected to said second means, to filter the difference signal to produce a filtered signal, third means, operatively connected to said separating means and said delay means, for adding the delayed chrominance signal to the separated chrominance signal to produce a first sum signal, fourth means, operatively connected to said low pass filter and said third means, for adding said filtered signal to said first sum signal to produce a second sum signal, fifth means, operatively connected to said first means and said fourth means, for adding said low-frequency component in three-dimensional frequency space to said second sum signal to produce a third sum signal, and sixth means, operatively connected to said separating means and said fifth means, for subtracting said third sum signal from the composite color signal, thereby producing the chrominance signal.

25. The device as claimed in claim 24, wherein said third sum signal is a luminance signal.

26. A device for producing a chrominance signal from a composite color signal comprising:

first means for producing three distinct signals from the composite color signal each separated chrominance signal being derived from a interfield processing of the composite color signal, and for outputting said three distinct signals;

selecting means, operatively connected to said first means, for evaluating a correlation relationship between points in different fields and for selecting one of the said three distinct signals in accordance with the correlation evaluation; and second means, operatively connected to said selecting means, for intrafield processing the selected signal, thereby producing the chrominance signal.

27. The device as claimed in claim 26 wherein said second means is a two-dimensional band pass filter.

28. The device as claimed in claim 26 wherein said second means comprises:

delay means, operatively connected to said selecting means, for delaying the selected signal by one horizontal line;

subtracting means, operatively connected to said selecting and said delay means, for subtracting the delayed first signal from the selected signal to produce a resultant signal; and a band pass filter, operatively connected to said subtracting means, to filter the resultant signal, thereby producing the chrominance signal.

29. The device as claimed in claim 26 wherein said first means mathematically sums a composite color signal of an objective sample point in a first field and one of a plurality of composite color signals of sample points located proximate to the objective sample point in a second field to provide interfield processing of the composite color signal.

30. The device as claimed in claim 29 wherein said selecting means further comprises:

correlation means for calculating a difference signal among the sample points in which chrominance subcarriers are in phase between frames and spaced apart from one another by one frame and for determining a direction of the sample points, located proximate to the objective sample point, which has a highest correlation value and a direction which has a lowest correlation value.

31. The device as claimed in claim 26 wherein said second means comprising:

delay means, operatively connected to said separating means, for delaying the separated chrominance signal by one horizontal line;

subtracting means, operatively connected to said separating means and said delay means, for subtracting the delayed chrominance signal from the separated chrominance signal to produce a resultant signal; and a band pass filter, operatively connected to said subtracting means, to filter the resultant signal, thereby producing the chrominance signal.

32. The device as claimed in claim 26, wherein said first means outputs said composite color signal; and said selecting means selects either one of said three distinct signals or said composite color signal in accordance with the correlation evaluation.

33. The device as claimed in claim 32 wherein the selecting means further comprises:

correlation means for calculating a difference signal among the sample points in which chrominance subcarriers are in phase between frames and spaced apart from one another by one frame and for determining a direction of the sample points, located proximate to the objective sample point, which has a highest correlation value and a direction which has a lowest correlation value;

threshold means for determining when the lowest correlation value is below a first threshold value and the highest correlation value is above a second threshold value;

said selecting means outputting said composite color signal when said threshold means determines that the lowest correlation value is below the first threshold value and the highest correlation value is above the second threshold value;

said selecting means outputting one of the three distinct signals which corresponds to the highest correlation value when said threshold means determines that the lowest correlation value is not below the first threshold value and the highest correlation value is not above the second threshold value.

34. The device as claimed in claim 26, wherein said first means performs interfield processing on adjacent fields to produce said three distinct signals.

35. The device as claimed in claim 26, wherein said first means outputs the separated chrominance signal and the composite color signal;

said second means including,
third means, operatively connected to said first means, for generating a high frequency component in three-dimensional frequency space; and
fourth means, operatively connected to said first means and said third means, for generating the chrominance signal from the composite color signal, the separated chrominance signal, and the high frequency component in three-dimensional frequency space.

36. The device as claimed in claim 26, wherein said first means outputs the first signal and the composite color signal, the first signal being a high-frequency component in three-dimensional frequency space;

said second means including
delay means, operatively connected to said first means, for delaying the first signal by one horizontal line,
third means, operatively connected to said first means, for subtracting the first signal from the composite color signal to produce a low-frequency component in three-dimensional frequency space,
fourth means, operatively connected to said first means and said delay means, for subtracting the delayed first signal from the first signal to produce a difference signal,
fifth means, operatively connected to said first means and said delay means, for adding the delayed first signal to the first signal to produce a first sum signal,
sixth means, operatively connected to said low pass filter and said fifth means, for adding said filtered signal to said first sum signal to produce a second sum signal,
seventh means, operatively connected to said third means and said sixth means, for adding said low-frequency component in three-dimensional frequency space to said second sum signal to produce a third sum signal, and
eighth means, operatively connected to said first means and said seventh means, for subtracting said third sum signal from the composite color signal, thereby producing the chrominance signal.

37. The device as claimed in claim 36, wherein said third sum signal is a luminance signal.

38. A device for producing a chrominance signal from a composite color signal comprising:

first means for producing a first signal from interfield processing the composite color signal;

second means for intrafield processing the first signal to produce the chrominance signal; and wherein said first means outputs the first signal and the composite color signal, the first signal being a high-frequency component in three-dimensional frequency space;

said second means including
delay means, operatively connected to said first means, for delaying the first signal by one horizontal line,
third means, operatively connected to said first means, for subtracting the first signal from the composite color signal to produce a low-frequency component in three-dimensional frequency space,
fourth means, operatively connected to said first means and said delay means, for subtracting the delayed first signal from the first signal to produce a difference signal,
fifth means, operatively connected to said first means and said delay means, for adding the delayed first signal to the first signal to produce a first sum signal,
sixth means, operatively connected to said low pass filter and said fifth means, for adding said filtered signal to said first sum signal to produce a second sum signal,
seventh means, operatively connected to said third means and said sixth means, for adding said low-frequency component in three-dimensional frequency space to said second sum signal to produce a third sum signal, and
eighth means, operatively connected to said first means and said seventh means, for subtracting said third sum signal from the composite color signal, thereby producing the chrominance signal.

39. The device as claimed in claim 38 wherein said third sum signal is a luminance signal.

40. A device for producing a chrominance signal from a composite color signal comprising:

first means for producing a first signal from interfield processing the composite color signal;

second means for intrafield processing the first signal to produce the chrominance signal; and wherein said first means outputs the separated chrominance signal and the composite color signal;

said second means including,
third means, operatively connected to said first means, for generating a high frequency component in three-dimensional frequency space; and
fourth means, operatively connected to said first means and said third means, for generating the chrominance signal from the composite color signal, the separated chrominance signal, and the high frequency component in three-dimensional frequency space.

41. A device for producing a luminance and chrominance signal from a composite color signal comprising:

separating means for separating a chrominance signal form the composite color signal by using a composite signal from a first field and a composite signal from a second field;

filter means for filtering the separated chrominance signal, thereby producing the chrominance signal;

first subtracting means, operatively connected to said filter means, for subtracting the chrominance signal from the composite color signal to produce the luminance signal; and wherein said separating means outputs the separated chrominance signal and the composite color signal;

said filter means including,
  first means, operatively connected to said separating means, for generating a high frequency component in three-dimensional frequency space; and
  second means, operatively connected to said separating means and said first means, for generating the chrominance signal from the composite color signal, the separated chrominance signal, and the high frequency component in three-dimensional frequency space.

42. A device for producing a luminance signal and a chrominance signal from a composite color signal comprising:
  separating means for generating three distinct separated chrominance signals from the composite color signal, each separated chrominance signal being derived from a composite color signal of a first field and a composite color signal of a second field, and for outputting said three distinct separated chrominance signals and the composite color signal;
  selecting means, operatively connected to said separating means, for evaluating a correlation relationship between points in different fields and for selecting either one of the said three distinct separated chrominance signals or the composite color signal in accordance with the correlation evaluation; and
  filter means, operatively connected to said selecting means, for filtering the selected signal to produce the chrominance signal and the luminance signal.

43. The device as claimed in claim 42 wherein said filter means includes a two dimensional band pass filter.

44. The device as claimed in claim 42 wherein said filter means comprises:
  delay means, operatively connected to said separating means, for delaying the separated chrominance signal by one horizontal line;
  subtracting means, operatively connected to said separating means and said delay means, for subtracting the delayed chrominance signal from the separated chrominance signal to produce a resultant signal; and
  a band pass filter, operatively connected to said second subtracting means, to filter the resultant signal, thereby producing the chrominance signal.

45. The device as claimed in claim 42 wherein said separating means mathematically sums a composite color signal of an objective sample point in a first field and one of a plurality of composite color signals of sample points located proximate to the objective sample point in a second field to provide interfield processing of the composite color signal.

46. The device as claimed in claim 45 wherein said selecting means further comprises:
  correlation means for calculating a difference signal among the sample points in which chrominance subcarriers are in phase between frames and spaced apart from one another by one frame and for determining a direction of sample points, located proximate to the objective sample point, which has a highest correlation value and a direction which has a lowest correlation value.

47. The device as claimed in claim 42, wherein said separating means comprises:
  first delay means for delaying said composite color signal by 262 lines;
  second delay means for delaying said composite color signal by two pixels;
  first subtractor means for subtracting output of said first delay from output of said second delay to generate one of said distinct separated chrominance signals;
  third delay means for delaying output from said first delay by four pixels;
  second subtractor means for subtracting output of said third delay from output of said second delay to generate one of said distinct separated chrominance signals;
  fourth delay means for delaying output from said first delay by one line;
  fifth delay means for delaying output from said fourth delay by two pixels; and
  third subtractor means for subtracting output of said fifth delay from output of said second delay to generate one of said distinct separated chrominance signals.

48. The device as claimed in claim 42, wherein
  said separating means outputs the separated chrominance signal and the composite color signal;
  said filter means including,
    first means, operatively connected to said separating means, for generating a high frequency component in three-dimensional frequency space; and
    second means, operatively connected to said separating means and said first means, for generating the chrominance signal from the composite color signal, the separated chrominance signal, and the high frequency component in three-dimensional frequency space.

49. The device as claimed in claim 42, further comprising subtracting means, operatively connected to said filter means, for subtracting the chrominance signal from the composite color signal to produce a luminance signal.

50. The device as claimed in claim 42, wherein
  said separating means outputs said composite color signal; and
  said selecting means selects either one of said three distinct separated chrominance signals or said composite color signal in accordance with the correlation evaluation.

51. The device as claimed in claim 50 wherein said selecting means further comprises:
  correlation means for calculating a difference signal among the sample points in which chrominance subcarriers are in phase between frames and spaced apart from one another by one frame and for determining a direction of sample points, located proximate to the objective sample point, which has a highest correlation value and a direction which has a lowest correlation value
  threshold means for determining when the lowest correlation value is below a first threshold value and the highest correlation value is above a second threshold value;
  said selecting means outputting said composite color signal when said threshold means determines that the lowest correlation value is below the first threshold value and the highest correlation value is above the second threshold value;
  said selecting means outputting the separated chrominance signal corresponding to the highest correlation value when said threshold means determines that the lowest correlation value is not below the first threshold value and the highest correlation value is not above the second threshold value.

52. The device as claimed in claim 42, wherein said separating means generates said three distinct separated chrominance signals using said composite color signal of said second field which is adjacent to said first field.

53. A device for producing a chrominance signal from a composite color signal comprising:

separating means for separating a chrominance signal from the composite color signal by using a composite color signal from a first field and a composite color signal from a second field;

filter means for filtering the separated chrominance signal, thereby producing the chrominance signal; and wherein said separating means outputs the separated chrominance signal and the composite color signal;

said filter means including, first means, operatively connected to said separating means, for generating a high frequency component in three-dimensional frequency space; and second means, operatively connected to said separating means and said first means, for generating the chrominance signal from the composite color signal, the separated chrominance signal, and the high frequency component in three-dimensional frequency space.

54. The device as claimed in claim 53 wherein said filter is a two dimensional band pass filter.

55. The device as claimed in claim 53 wherein said filter comprises:

a delay, operatively connected to said selector circuit, to delay the separated chrominance signal by one horizontal line;

a subtractor, operatively connected to said selector circuit and said delay, to subtract the delayed chrominance signal from the selected chrominance signal to produce a resultant signal; and a band pass filter, operatively connected to said subtractor, to filter the resultant signal, thereby producing the chrominance signal.

56. The device as claimed in claim 53 wherein said interfield processing circuit mathematically sums a composite color signal of an objective sample point in a first field and one of a plurality of composite color signals of sample points located proximate to the objective sample point in a second field to provide interfield processing of the composite color signal.

57. The device as claimed in claim 53, wherein said interfield processing circuit separates said three chrominance signals using said composite signal of said second field which is adjacent to said first field.

58. The device as claimed in claim 53, wherein said interfield processing circuit comprises:

a first delay delaying said composite color signal by 262 lines;

a second delay delaying said composite color signal by two pixels;

a first subtractor subtracting output of said first delay from output of said second delay to generate one of said three chrominance signals;

a third delay delaying output from said first delay by four pixels;

a second subtractor subtracting output of said third delay from output of said second delay to generate one of said three chrominance signals;

a fourth delay delaying output from said first delay by one line;

a fifth delay delaying output from said fourth delay by two pixels; and a third subtractor subtracting output of said fifth delay from output of said second delay to generate one of said three chrominance signals.

59. A device for producing a chrominance signal from a composite color signal comprising:

an interfield processing circuit to separate a chrominance signal from the composite color signal by using a composite signal from a first field and a composite signal from a second field;

a filter to filter the separated chrominance signal, thereby producing the chrominance signal; and wherein said interfield processing circuit outputs the separated chrominance signal and the composite color signal, the separated chrominance signal being a high-frequency component in three-dimensional frequency space;

said filter including, a delay, operatively connected to said interfield processing circuit, to delay the separated chrominance signal by one horizontal line, a first subtractor, operatively connected to said interfield processing circuit, to subtract the separated chrominance signal from the composite color signal to produce a low-frequency component in three-dimensional frequency space, a second subtractor, operatively connected to said interfield processing circuit and said delay, to subtract the delayed chrominance signal from the separated chrominance signal to produce a different signal, a low pass filter, operatively connected to said second subtractor, to filter the difference signal to produce a filtered signal, a first adder, operatively connected to said interfield processing circuit and said delay, to add the delayed chrominance signal to the separated chrominance signal to produce a first sum signal, a second adder, operatively connected to said low pass filter and said first adder, to add said filtered signal to said first sum signal to produce a second sum signal, a third adder, operatively connected to said first subtractor and said second adder, to add said low-frequency component in three-dimensional frequency space to said second sum signal to produce a third sum signal, and a third subtractor, operatively connected to said interfield processing circuit and said third adder, to subtract said third sum signal from the composite color signal, thereby producing the chrominance signal.

60. The device as claimed in claim 59 wherein said third sum signal is a luminance signal.

61. A method for producing a chrominance signal from a composite color signal comprising the steps of:

(a) separating a chrominance signal from the composite color signal by using a composite color signal from a first field and a composite color signal from a second field;

(b) filtering the separated chrominance signal, thereby producing the chrominance signal; and the separated chrominance signal is a high-frequency component in three-dimensional frequency space; and said step (b) includes the sub-steps of, (b1) delaying the separated chrominance signal by one horizontal line, (b2) subtracting the separated chrominance signal from the composite color signal to produce a low-frequency component in three-dimensional frequency space, (b3) subtracting the delayed chrominance signal from the separated chrominance signal to reproduce a difference signal, (b4) filtering the difference signal to produce a filtered signal, (b5) adding the delayed chrominance signal to the separated chrominance signal to produce a first sum signal, (b6) adding the filtered signal to the first sum signal to produce a second sum signal, (b7) adding the low-frequency component in three-dimensional frequency space to the second sum signal to produce a third sum signal, and (b8) subtracting the third sum signal from the composite color signal, thereby producing the chrominance signal.

62. The method as claimed in claim 61 wherein the third sum signal is a luminance signal.

63. A method for producing a chrominance signal from a composite color signal comprising the steps of:

(a) generating three distinct separated chrominance signals from the composite color signal, each separated chrominance signal being derived from a composite color signal of a first field and a composite color signal of a second field;

(b) evaluating a correlation relationship between points in different fields;

(c) selecting either one of the said three distinct separated chrominance signals or the composite color signal in accordance with the correlation evaluation of said step (b); and (d) filtering the selected signal, thereby producing the chrominance signal.

64. The method as claimed in claim 63 wherein said step (d) executes two-dimensional band pass filtering.

65. The method as claimed in claim 63 wherein said step (b) comprises the sub-steps of:

(b1) delaying the separated chrominance signal by one horizontal line;

(b2) subtracting the delayed chrominance signal from the separated chrominance signal to produce a resultant signal; and (b3) filtering the resultant signal, thereby producing the chrominance signal.

66. The method as claimed in claim 63, wherein step (c) selects either one of said three distinct separated chrominance signals or the composite color signal in accordance with the correlation evaluation of said step (b).

67. The method as claimed in claim 63 wherein said step (a) comprises the steps of:

(a1) delaying said composite color signal by 262 lines;

(a2) delaying said composite color signal by two pixels;

(a3) subtracting output of said step (a1) from output of said step (a2) to generate one of said distinct separated chrominance signals;

(a4) delaying output from said first delay by four pixels;

(a5) subtracting output of said step (a4) from output of said step (a2) to generate one of said distinct separated chrominance signals;

(a6) delaying output from said step (a1) by one line;

(a7) delaying output from said step (a6) by two pixels; and (a8) subtracting output of said step (a7) from output of said step (a2) to generate one of said distinct separated chrominance signals.

68. The method as claimed in claim 63, wherein the separated chrominance signal being a high-frequency component in three-dimensional frequency space;

said step (b) means including the sub-steps of, (b1) delaying the separated chrominance signal by one horizontal line, (b2) subtracting the delayed chrominance signal from the composite color signal to produce a low-frequency component in three-dimensional frequency space, (b3) subtracting the delayed chrominance signal from the separated chrominance signal to produce a difference signal, (b4) filtering the difference signal to produce a filtered signal, (b5) adding the delayed chrominance signal to the separated chrominance signal to produce a first sum signal, (b6) adding the filtered signal to the first sum signal to produce a second sum signal, (b7) adding the low-frequency component in three-dimensional frequency space to the second sum signal to produce a third sum signal, and (b8) subtracting the third sum signal from the composite color signal, thereby producing the chrominance signal.

69. The method as claimed in claim 68 wherein the third sum signal is a luminance signal.

70. The method as claimed in claim 63 wherein said step (a) mathematically sums a composite color signal of an objective sample point in a first field and one of a plurality of composite color signals of sample points located proximate to the objective sample point in a second field to provide interfield processing of the composite color signal.

71. The method as claimed in claim 70 wherein said step (b) calculates a difference signal among the sample points in which chrominance subcarriers are in phase between frames and spaced apart from one another by one frame and determines a direction of sample points, located proximate to the objective sample point, which has a highest correlation value and a direction which has a lowest correlation value.

72. The method as claimed in claim 66 wherein said step (b) calculates a difference signal among the sample points in which chrominance subcarriers are in phase between frames and spaced apart from one another by one frame and determines a direction of sample points, located proximate to the objective sample point, which has a highest correlation value and a direction which has a lowest correlation value; and further comprising the steps of:

(e) determining when the lowest correlation value is below a first threshold value and the highest correlation value is above a second threshold value; and wherein said step (c) selects the composite color signal when said step (e) determines that the lowest correlation value is below the first threshold value and the highest correlation value is above the second threshold value; and said step (c) selects the separated chrominance signal corresponding to the highest correlation value when said step (e) determines that the lowest correlation value is not below the first threshold value and the highest correlation is not above the second threshold value.

73. A method for separating luminance and chrominance signals from a composite color television signal, in which the frequency of the color signal is multiplexed over a high-frequency region of the luminance signal, comprising the steps:

(a) mathematically summing a composite color signal of an objective sample point in one field and one of a plurality of composite color signals of sample points located proximate to the objective sample point in a picture, and within fields adjacent to the one field, to provide the interfield separated chrominance signals;

(b) calculating a difference signal among the sample points in which chrominance subcarriers are in phase between the frames and spaced apart from one another by one frame, the calculated difference signal being used to detect a direction in which sample points, located proximate to the objective sample point, have a highest correlation; and (c) selecting a separated chrominance signal having a direction of highest correlation, based on the direction of correlation calculated by said step (b).

74. The method as claimed in claim 73, further comprising the steps of:

(d) detecting motion in the composite color television signal, based on interframe correlation; and (e) separating the luminance and color signals, based on the interframe correlation.

75. The method as claimed in claim 74, further comprising the steps of:

(f) mixing an output of said step (c) and an output of said step (e) in accordance with a mixing ratio determined based on output of said step (d).

76. The method as claimed in claim 75 wherein said step (a) comprises the step of (a1) extracting a color signal by subtracting a signal indicative of the objective sample point and signals indicative of three sample points located in a field spaced one field away from the objective sample point, and having chrominance subcarriers placed out of phase by 180°.

77. The method as claimed in claim 75, further comprising the step of (g) two-dimensional band pass filtering said selected signal to extract only a color signal having a predetermined frequency.

78. The method as claimed in claim 75, further comprising the step of subtracting said color signal from said composite color signal to generate a luminance signal.

79. The method as claimed in claim 72, wherein said step (g) comprises the steps of:

(g2) delaying the selected signal output by one horizontal line;

(g2) subtracting output of said step (g1) from said selected signal; and (g3) band pass filtering output of said step (g2).

80. The method as claimed in claim 75, further comprising the step of (g) separating luminance and color signals using infield band limitations.

81. The method as claimed in claim 80, wherein said step (b) includes the steps of:

(b1) calculating differences between the sample points in which chrominance subcarriers are in phase between frames space apart from one another by one frame;

(b2) determining respective absolute values from respective output signals of said step (b1);

(b3) determining a minimum value of signals output from said step (b2);

(b4) determining a maximum value of signals output from said step (b2);

(b5) comparing outputs of said steps (b3) and (b4) with predetermined thresholds;

(b6) selecting an output from said step (g) if the output of said step (b4) is smaller than a predetermined threshold e and if the output of said (b3) is larger than another predetermined threshold $\beta$; and (b7) selecting an output from said step (a) if the output of said step (b4) is larger than said predetermined threshold e and if the output of said step (b3) is smaller than said another predetermined threshold $\beta$.

82. The method of claim 81, wherein said step (b1) calculates differences between sample points in fields adjacent forwardly and rearwardly to said field containing said objective sample point.

83. A system for producing a luminance and chrominance signal from a composite color signal comprising:

separating means for separating a chrominance signal from the composite color signal by using a composite signal from a first field and a composite signal from a second field;

filter means for filtering the separated chrominance signal, thereby producing the chrominance signal;

motion detecting means for detecting motion in the composite color signal based on interframe correlation;

interframe correlation luminance and chrominance signal separation means for separating the luminance and chrominance signals based on the interframe correlation; and mixing means for receiving more of an output of said filter means if the motion detected by said motion detecting means is relatively large and for receiving more of an output of said interframe correlation luminance and chrominance signal separating means if the motion detected by said motion detecting means is relatively small, said relatively large motion being large relative to said relatively small motion, whereby luminance and chrominance signals outputted from said filter means and interframe correlation luminance and chrominance signal separating means can be mixed.

84. The system as claimed in claim 83 wherein said filter means is a two dimensional band pass filter.

85. The system as claimed in claim 83 wherein said filter means comprises:

delay means, operatively connected to said separating means, for delaying the separated chrominance signal by one horizontal line;

subtractor means, operatively connected to said separating means and said delay means, for subtracting the delayed chrominance signal from the separated chrominance signal to produce a resultant signal; and a band pass filter, operatively connected to said subtractor means, to filter the resultant signal, thereby producing the chrominance signal.

86. The system as claimed in claim 83 wherein said separating means outputs the separated chrominance signal and the composite color signal, the separated chrominance signal being a high-frequency component in three-dimensional frequency space;

said filter means including, delay means, operatively connected to said separating means, for delaying the separated chrominance signal by one horizontal line, first means, operatively connected to said separating means, for subtracting the separated chrominance signal from the composite color signal to produce a low-frequency component in three-dimensional frequency space, second means, operatively connected to said separating means and said delay means, for subtracting the delayed chrominance signal from the separated chrominance signal to produce a difference signal, a low pass filter, operatively connected to said second means, to filter the difference signal to produce a filtered signal, third means, operatively connected to said separating means and said delay means, for adding the delayed chrominance signal to the separated chrominance signal to produce a first sum signal, fourth means, operatively connected to said low pass filter and said third means, for adding said filtered signal to said first sum signal to produce a second sum signal, fifth means, operatively connected to said first means and said fourth means, for adding said low-frequency component in three-dimensional frequency space to said second sum signal to produce a third sum signal, and sixth means, operatively connected to said separating means and said fifth means, for subtracting said third sum signal from the composite color signal, thereby producing the chrominance signal.

87. The system as claimed in claim 86 wherein said third sum signal is a luminance signal.

88. The system as claimed in claim 83 wherein said separating means outputs the separated chrominance signal and the composite color signal;

said filter means including, first means, operatively connected to said separating means, for generating a high frequency component in three-dimensional frequency space; and second means, operatively connected to said separating means and said first means, for generating the chrominance signal from the composite color signal, the separated chrominance signal, and the high frequency component in three-dimensional frequency space.

89. A system for producing a luminance and chrominance signal from a composite color signal comprising:

separating means for generating three distinct separated chrominance signals from the composite signal, each separated chrominance signal being derived from a composite color signal of a first field and a composite color signal of a second field, and for outputting said three distinct separated chrominance signals and the composite signal;

selecting means, operatively connected to said separating means, for evaluating a correlation relationship between points in different fields and for selecting either one of the said three distinct separated chrominance signals or the composite color signal in accordance with the correlation evaluation;

filter means, operatively connected to said selecting means, thereby producing the chrominance signal; and motion detecting means for detecting motion in the composite color signal based on interframe correlation;

interframe correlation luminance and chrominance signal separation means for separating the luminance and chrominance signals based on the interframe correlation; and mixing means for receiving more of an output of said filter means if the motion detected by said motion detecting means is relatively large and for receiving more of an output of said interframe correlation luminance and chrominance signal separating means if the motion detected by said motion detecting means is relatively small, said relatively large motion being large relative to said relatively small motion, whereby luminance and chrominance signals outputted from said filter means and interframe correlation luminance and chrominance signal separating means can be mixed.

90. A device for producing a chrominance signal from a composite color signal comprising:

separating means for generating at least two distinct separated chrominance signals from the composite color signal, each separated chrominance signal being derived from a composite color signal of a first field and a composite color signal of a second field, and for outputting said distinct separated chrominance signals;

selecting means, operatively connected to said separating means, for evaluating a correlation relationship between sample points in different fields and for selecting one of said distinct separated chrominance signals in accordance with the correlation evaluation; and filter means, operatively connected to said selecting means, for filtering the selected signal, thereby producing the chrominance signal.

91. A device for producing a chrominance signal from a composite color signal comprising:

an interfield processing circuit to separate at least two chrominance signals from the composite color signal by using a composite signal from the first field and a composite signal from a second field;

selecting circuit, operatively connected to said interfield processing circuit, for evaluating a correlation relationship between points in different fields and for selecting one of said distinct separated chrominance signals in accordance with the correlation evaluation; and a filter to filter the selected chrominance signal, thereby producing the chrominance signal.

92. A method for producing a chrominance signal from a composite color signal comprising the steps of:

(a) generating at least two distinct separated chrominance signals from the composite color signal, each separated chrominance signal being derived from a composite color signal of a first field and a composite color signal of a second field;

(b) evaluating a correlation relationship between points in different fields;

(c) selecting one of said distinct separated chrominance signals in accordance with the correlation evaluation of said step (b); and (d) filtering the selected signal, thereby producing the chrominance signal.

93. The method as claimed in claim 63, wherein step (a) generates said three distinct separated chrominance signals using said composite signal of said second field which is adjacent to said first field.

94. The method as claimed in claim 63, wherein said step (d) comprises the sub-steps of:

(d1) generating a high frequency component in three-dimensional frequency space of the selected signal; and (d2) generating the chrominance signal from the composite color signal, the selected signal, and the high frequency component in three-dimension frequency space of the selected signal.

95. A device for producing a chrominance signal from a composite color signal comprising:

an interfield processing circuit to separate three chrominance signals from the composite color signal by using a composite signal from a first field and a composite signal from a second field;

a selector circuit, operatively connected to said separating means, to evaluate a correlation relationship between points in different fields and to select one of said three chrominance signals in accordance with the correlation evaluation; and a filter to filter the selected chrominance signal, thereby producing the chrominance signal.

96. The device as claimed in claim 26, wherein said first means comprises:

first delay means for delaying said composite color signal by 262 lines;

second delay means for delaying said composite color signal by two pixels;

first subtractor means for subtracting output of said first delay from output of said second delay to generate one of said distinct separated chrominance signals;

third delay means for delaying output from said first delay by four pixels;

second subtractor means for subtracting output of said third delay from output of said second delay to generate one of said distinct separated chrominance signals;

fourth delay means for delaying output from said first delay by one line;

fifth delay means for delaying output from said fourth delay by two pixels; and third subtractor means for subtracting output of said fifth delay from output of said second delay to generate one of said distinct separated chrominance signals.

97. A method for producing a chrominance signal from a composite color signal comprising the steps of:

(a) separating a first chrominance signal from the composite color signal by using a composite color signal from a first field and a composite color signal from a second field;

(b) generating a high frequency component in three-dimensional frequency space of the first chrominance signal;

(c) generating a second chrominance signal from the composite signal, the first chrominance signal and the high frequency component in three-dimensional frequency space of the first chrominance signal.

* * * * *